United States Patent
Altberg et al.

(10) Patent No.: US 9,202,217 B2
(45) Date of Patent: *Dec. 1, 2015

(54) METHODS AND APPARATUSES TO MANAGE MULTIPLE ADVERTISEMENTS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Virginia Hong-Jia Yang, Foster City, CA (US)

(73) Assignee: YELLOWPAGES.COM LLC

( * ) Notice: Subject to any disclaimer, the term of this patent is extended or adjusted under 35 U.S.C. 154(b) by 2239 days.

This patent is subject to a terminal disclaimer.

(21) Appl. No.: 11/556,668

(22) Filed: Nov. 3, 2006

(65) Prior Publication Data

US 2007/0067219 A1    Mar. 22, 2007

(51) Int. Cl.
*G06Q 30/00* (2012.01)
*G06Q 30/02* (2012.01)
(Continued)

(52) U.S. Cl.
CPC .............. *G06Q 30/00* (2013.01); *G06Q 30/02* (2013.01); *G06Q 30/0254* (2013.01); *G06Q 30/0273* (2013.01); *G06Q 30/0275* (2013.01); *G06Q 30/04* (2013.01); *H04M 15/00* (2013.01); *H04M 15/09* (2013.01); *H04M 15/51* (2013.01); *H04M 15/68* (2013.01); *G06Q 30/0243* (2013.01); *G06Q 30/0244* (2013.01);
(Continued)

(58) Field of Classification Search
CPC ................... H04M 225/0196; H04M 2215/54; H04M 2215/66; H04M 15/00; H04M 15/09; H04M 15/68; H04M 15/51; G06Q 30/075; G06Q 30/0254; G06Q 30/0273; G06Q 30/0243; G06Q 30/0244
USPC ........... 705/14.71, 14.52, 14.69, 14.42, 14.43
See application file for complete search history.

(56) References Cited

U.S. PATENT DOCUMENTS

| | | | |
|---|---|---|---|
| 4,850,007 A | 7/1989 | Marino et al. | |
| 4,963,995 A | 10/1990 | Lang | |
| 5,057,932 A | 10/1991 | Lang | |

(Continued)

FOREIGN PATENT DOCUMENTS

| | | |
|---|---|---|
| WO | 9847295 | 10/1998 |
| WO | 0057326 | 9/2000 |

(Continued)

OTHER PUBLICATIONS

"AtOnce Talks Up E-mail Marketing Campaigns with ITXC Push to Talk Service," Business Wire, Feb. 26, 2001.

(Continued)

*Primary Examiner* — Raquel Alvarez
(74) *Attorney, Agent, or Firm* — Alston & Bird LLP

(57) ABSTRACT

Systems and methods to facilitate the management of multiple pay for performance advertisements. In one embodiment, a method includes: generating a user interface to show a plurality of advertisements simultaneously and to allow editing of any of the plurality of advertisements; and updating an advertisement database according to input received in the user interface. In one embodiment, the each advertisement of the plurality of advertisements is charged for according to a price bid in response to a communication lead generated from the advertisement. In one embodiment, the plurality of advertisements are selected from advertisements of more than one user.

16 Claims, 29 Drawing Sheets

| Ad Manager | | | | |
|---|---|---|---|---|
| View the details of an ad by click on its name below. You can also easily modify one or more ads by selecting the ads and then choosing the desired action. You can also create one or more new ads. | | | | |
| Ad ID | Max Price Per Call | Ad Status | Top 5 Competitors' Max Price Per Call | |
| ☐ lst1 | $6.00 | Advertiser Paused | $6.00 $2.01 $2.00 $2.00 $2.00 | |
| ☑ lst2 | $3.00 | Advertiser Paused | $3.00 $2.01 $2.00 $2.00 $2.00 | |
| ☑ lst3 | $2.01 | Active | $2.05 $2.04 $2.03 $2.02 $2.01 | |
| ☐ lst4 | $2.02 | Active | $2.05 $2.04 $2.03 $2.02 $2.01 | |
| ☐ lst5 | $2.03 | Active | $2.05 $2.04 $2.03 $2.02 $2.01 | |
| ☐ lst6 | $2.00 | Active | $2.00 $2.00 -- -- -- | |
| Edit Ads | Delete Ad | Edit Max Price Per Call | Activate | On Schedule | Pause |

(51) Int. Cl.
*G06Q 30/04* (2012.01)
*H04M 15/00* (2006.01)

(52) U.S. Cl.
CPC ............... *H04M 2215/0192* (2013.01); *H04M 2215/0196* (2013.01); *H04M 2215/54* (2013.01); *H04M 2215/66* (2013.01)

(56) References Cited

U.S. PATENT DOCUMENTS

| | | | |
|---|---|---|---|
| 5,164,839 A | 11/1992 | Lang | |
| 5,262,875 A | 11/1993 | Mincer et al. | |
| 5,440,334 A | 8/1995 | Walters et al. | |
| 5,524,146 A | 6/1996 | Morrisey et al. | |
| 5,696,965 A | 12/1997 | Dedrick | |
| 5,710,970 A | 1/1998 | Walters et al. | |
| 5,751,956 A | 5/1998 | Kirsch | |
| 5,774,534 A | 6/1998 | Mayer | |
| 5,793,851 A | 8/1998 | Albertson | |
| 5,850,433 A | 12/1998 | Rondeau | |
| RE36,111 E | 2/1999 | Neville | |
| 5,870,546 A | 2/1999 | Kirsch | |
| 5,937,390 A | 8/1999 | Hyodo | |
| 5,963,202 A | 10/1999 | Polish | |
| 5,963,861 A | 10/1999 | Hanson | |
| 5,978,567 A | 11/1999 | Rebane et al. | |
| 5,995,705 A | 11/1999 | Lang | |
| 5,999,965 A | 12/1999 | Kelly | |
| 6,108,704 A | 8/2000 | Hutton et al. | |
| 6,189,030 B1 | 2/2001 | Kirsch et al. | |
| 6,208,713 B1 | 3/2001 | Rahrer et al. | |
| 6,216,111 B1 | 4/2001 | Walker et al. | |
| 6,243,684 B1 | 6/2001 | Stuart et al. | |
| 6,269,361 B1 | 7/2001 | Davis et al. | |
| 6,275,490 B1 | 8/2001 | Mattaway et al. | |
| 6,327,572 B1 | 12/2001 | Morton et al. | |
| 6,466,966 B1 | 10/2002 | Kirsch et al. | |
| 6,470,079 B1 | 10/2002 | Benson | |
| 6,470,181 B1 | 10/2002 | Maxwell | |
| 6,510,417 B1 | 1/2003 | Woods et al. | |
| 6,529,878 B2 | 3/2003 | De Rafael et al. | |
| 6,560,576 B1 | 5/2003 | Cohen et al. | |
| 6,769,020 B2 | 7/2004 | Miyazaki et al. | |
| 6,850,965 B2 | 2/2005 | Allen | |
| 6,859,833 B2 | 2/2005 | Kirsch et al. | |
| 6,968,174 B1 | 11/2005 | Trandal et al. | |
| 7,076,037 B1 | 7/2006 | Gonen et al. | |
| 7,092,901 B2 | 8/2006 | Davis et al. | |
| 7,103,010 B2 | 9/2006 | Melideo | |
| 7,200,413 B2 | 4/2007 | Montemer | |
| 7,212,615 B2 | 5/2007 | Wolmuth | |
| 7,231,405 B2 | 6/2007 | Xia | |
| 7,240,290 B2 | 7/2007 | Melideo | |
| 7,340,048 B2 * | 3/2008 | Stern et al. | 379/218.01 |
| 2001/0039510 A1 * | 11/2001 | Galomb | 705/14 |
| 2001/0048737 A1 | 12/2001 | Goldberg et al. | |
| 2002/0003867 A1 | 1/2002 | Rothschild et al. | |
| 2002/0010616 A1 | 1/2002 | Itzhaki | |
| 2002/0026457 A1 | 2/2002 | Jensen | |
| 2002/0044640 A1 | 4/2002 | Meek et al. | |
| 2002/0057776 A1 | 5/2002 | Dyer | |
| 2002/0065788 A1 * | 5/2002 | Nishikiori et al. | 705/80 |
| 2002/0090203 A1 | 7/2002 | Mankovitz | |
| 2002/0095331 A1 | 7/2002 | Osman et al. | |
| 2002/0107697 A1 | 8/2002 | Jensen | |
| 2002/0122547 A1 | 9/2002 | Hinchey et al. | |
| 2002/0147637 A1 * | 10/2002 | Kraft et al. | 705/14 |
| 2002/0173319 A1 | 11/2002 | Fostick | |
| 2002/0193094 A1 | 12/2002 | Lawless et al. | |
| 2003/0026397 A1 | 2/2003 | McCroskey | |
| 2003/0046161 A1 | 3/2003 | Kamangar et al. | |
| 2003/0046361 A1 | 3/2003 | Kirsch et al. | |
| 2003/0083042 A1 | 5/2003 | Abuhamdeh | |
| 2003/0105824 A1 | 6/2003 | Brechner et al. | |
| 2003/0138091 A1 | 7/2003 | Meek et al. | |
| 2003/0195787 A1 | 10/2003 | Brunk et al. | |
| 2003/0212600 A1 | 11/2003 | Hood et al. | |
| 2003/0220866 A1 * | 11/2003 | Pisaris-Henderson et al. | 705/37 |
| 2003/0223563 A1 | 12/2003 | Wolmuth | |
| 2003/0223565 A1 | 12/2003 | Montemer | |
| 2003/0225682 A1 | 12/2003 | Montemer | |
| 2003/0231754 A1 | 12/2003 | Stein et al. | |
| 2004/0003041 A1 | 1/2004 | Moore et al. | |
| 2004/0006511 A1 | 1/2004 | Montemer | |
| 2004/0008834 A1 | 1/2004 | Bookstaff | |
| 2004/0010518 A1 | 1/2004 | Montemer | |
| 2004/0023644 A1 | 2/2004 | Montemer | |
| 2004/0076403 A1 | 4/2004 | Mankovitz | |
| 2004/0091093 A1 | 5/2004 | Bookstaff | |
| 2004/0107137 A1 * | 6/2004 | Skinner | 705/14 |
| 2004/0174965 A1 | 9/2004 | Brahm et al. | |
| 2004/0174974 A1 | 9/2004 | Meek et al. | |
| 2004/0193488 A1 | 9/2004 | Khoo et al. | |
| 2004/0204997 A1 | 10/2004 | Blaser et al. | |
| 2004/0234049 A1 | 11/2004 | Melideo | |
| 2004/0235524 A1 | 11/2004 | Abuhamdeh | |
| 2004/0236441 A1 | 11/2004 | Melideo | |
| 2004/0247092 A1 | 12/2004 | Timmins et al. | |
| 2004/0249649 A1 | 12/2004 | Stratton et al. | |
| 2004/0254859 A1 | 12/2004 | Aslanian | |
| 2004/0260413 A1 | 12/2004 | Melideo | |
| 2005/0018829 A1 | 1/2005 | Baker | |
| 2005/0021744 A1 | 1/2005 | Haitsuka et al. | |
| 2005/0041647 A1 | 2/2005 | Stinnie | |
| 2005/0074100 A1 | 4/2005 | Lederman | |
| 2005/0076100 A1 | 4/2005 | Armstrong | |
| 2005/0080878 A1 | 4/2005 | Cunningham et al. | |
| 2005/0096980 A1 | 5/2005 | Koningstein | |
| 2005/0100153 A1 | 5/2005 | Pines et al. | |
| 2005/0105881 A1 | 5/2005 | Mankovitz | |
| 2005/0125416 A1 | 6/2005 | Kirsch et al. | |
| 2005/0135387 A1 | 6/2005 | Rychener et al. | |
| 2005/0209874 A1 | 9/2005 | Rossini | |
| 2005/0240432 A1 | 10/2005 | Jensen | |
| 2005/0245241 A1 | 11/2005 | Durand et al. | |
| 2005/0261964 A1 | 11/2005 | Fang | |
| 2005/0286688 A1 | 12/2005 | Scherer | |
| 2005/0289015 A1 | 12/2005 | Hunter et al. | |
| 2006/0003735 A1 | 1/2006 | Trandal et al. | |
| 2006/0004627 A1 | 1/2006 | Baluja | |
| 2006/0069610 A1 | 3/2006 | Rossini | |
| 2006/0106711 A1 | 5/2006 | Melideo | |
| 2006/0136310 A1 | 6/2006 | Gonen et al. | |
| 2006/0159063 A1 | 7/2006 | Kumer | |
| 2006/0166655 A1 | 7/2006 | Montemer | |
| 2006/0171520 A1 | 8/2006 | Kliger | |
| 2006/0173827 A1 | 8/2006 | Kliger | |
| 2006/0173915 A1 | 8/2006 | Kliger | |
| 2006/0182250 A1 | 8/2006 | Melideo | |
| 2006/0247999 A1 | 11/2006 | Gonen et al. | |
| 2006/0253434 A1 * | 11/2006 | Beriker et al. | 707/3 |
| 2007/0022005 A1 | 1/2007 | Hanna | |
| 2007/0038507 A1 | 2/2007 | Kumer | |
| 2007/0100956 A1 | 5/2007 | Kumer | |
| 2007/0129054 A1 | 6/2007 | Andronikov et al. | |
| 2007/0244754 A1 * | 10/2007 | Payne et al. | 705/14 |
| 2007/0269038 A1 | 11/2007 | Gonen et al. | |
| 2008/0270223 A1 | 10/2008 | Collins et al. | |
| 2008/0313083 A1 | 12/2008 | Altberg et al. | |

FOREIGN PATENT DOCUMENTS

| | | |
|---|---|---|
| WO | 0127825 | 4/2001 |
| WO | 0128141 | 4/2001 |

OTHER PUBLICATIONS

"ITXC Corp and Doubleclick Energize Banner Ads with Web Telephony; Companies Voice-Enable Banner Advertisements Using ITXC Push to Talk Service," Business Wire, Dec. 12, 2000.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

(56) References Cited

OTHER PUBLICATIONS

Jingle Networks, Inc., "Introducing 1-800 FREE411: First Nationwide Free Telephone Directory Assistance Service," Sep. 20, 2005.

Jingle Networks, Inc., "1-800-FREE411 Provides Two Great Opportunities to Acquire New Customers," available at least by Oct. 20, 2005.

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Jambo, "Welcome to Jambo—The Leader in Pay-Per-Call Solutions," company information retrieved from http://www.jambo.com, available at least by Oct. 17, 2005.

Ingenio, Inc., "FindWhat.com Enters Agreement with Ingenio to Offer Pay Per Call Advertising Platform," press release available at http://www.ingenio.com, Apr. 7, 2004.

ISA/US, International Search Report for International Application No. PCT/US05/12061, 3 pages, Nov. 17, 2006.

* cited by examiner

Create you ad by entering a headline, two lines of description and a phone number Example:

Bert's Plumbing
Best Plumbers in San Francisco
800-555-5407
Interest

To maximize your conversion rate and your ad's position, be as specific as possible in the description lines, and be sure you meet the requirements for ad format and content listed in the Editorial Guidelines Headline (maximum 26 characters)
`Bert's Plumbing`

Description line 1 (maximum 36 characters)
`Best Plumber in San Francisco!`

Description line 2 (maximum 36 characters)
`24/7/365. Guaranteed cheapest rates`

Phone number
`415-555-6823`

[ Create Ad & Continue >> ]

Google [Plumbing San Francisco]

Plumbing – San Francisco
Plumbing 1 – San Francisco
Plumbings – San Francisco

Plumber's of San Francisco

Scott's Plumbing Services

Better Homes - Plumbing

Bert's Plumbing
San Luca Plumbing
San Fran Plumbing

- Create an account on ingenio
- Create ad (see left)
- Determine keywords and geography (city, state, zip, etc.)
- Determine bid amounts daily budget
- Launch campaign
- Unique 800# is automatically generated and rendered in advertisement. 800# redirects to LONON's actual phone number
- LONON pays for each phone call received

FIG. 8A

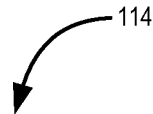
— 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS     scroll down for more listings

Dream Car Rentals                Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS              scroll down for more listings

Expedia: For All Your Car Rental Needs  http://www.expedia.com
Save with Expedia.com, your one-stop source for flights, hotels, vacation packages, cruises, and rental

FIG. 9

View Ad Statistics

Statistics of your selected users' ads for the past 7 days. Arrows down indicated that the data has decreased since the previous 7 day period

| Select Ad | Ad ID | Business Name | Ad Status | Total Impression | Avg. Conv. Rate (%) | Avg. Price Per Call ($) | Max. Price Per Call ($) | Avg. Position |
|---|---|---|---|---|---|---|---|---|
| UserID: JoeBob | | | | | | | | |
| ☐ | ad99 | Joe's Plumbing | Active | ↓1000 | 0.50 | 2.00 | 2.00 | 1.0 |
| ☐ | ad98 | Bob's Pest Control | Paused - low conversion | 2000 | ↓0.01 | 3.01 | ↓4.00 | 1.5 |
| UserID: MaryLou | | | | | | | | |
| ☐ | lst1 | Mary's Cleaners | Active | 3200 | 2.50 | 4.25 | 8.00 | ↓2.0 |
| ☐ | lst2 | Lou's Pizza | Active - conversion warned | 8888 | ↓0.07 | 12.00 | 12.00 | 1.7 |
| ☐ | lst3 | Mo's Pizza | Pending Acceptance | ↓5 | 0.00 | 7.80 | 8.00 | 1.2 |
| ☐ | lst4 | Curly's Pizza | Paused – needs editing | 400 | 0.00 | ↓3.01 | ↓9.00 | 1.0 |
| ☐ | lst5 | Oliver's Pizza | Active | 6500 | 0.40 | 3.45 | 7.00 | 1.5 |
| ☐ | lst6 | Cheech's Pizza | Advertiser Paused | ↓0 | 0.00 | 2.00 | 2.00 | n/a |

[ Edit Selected Ads ]  [ Cancel ]

FIG. 22

Select Users and Fields — 2041

Select the users who's ads you would like to view:

| Available Users | | Selected Users |
|---|---|---|
| akhouri | 2005 → 2007 → | andrewl |
| alfredo | 2009 Add → | |
| amy | 2011 ← Remove | |
| andrea | | |

Add User Not on List

User Name: _____ 2017

Password: _____ 2019

2015 Add →

Select the field(s) you want to edit: (select all)

Ad Contact Info: (select all) — 2047, 2045, 2042
        ☐ Address    2049    ☐ Fax    ☐ Phone

Ad Basic Display: (select all)
        ☐ Business Name    ☐ Bid Price    ☐ Categories    ☐ Description
        ☐ Service Area    ☐ Status

Ad Detailed Display: (select all)
        ☐ Ad Details    ☐ Coupon    ☐ Logo    ☐ Callable Hours
        ☐ Payment Methods 2043 — Edit Ads

FIG. 23

Edit/Delete Ads

| Action | Listing ID | Ad ID | Business Name | Ad Status | Description Line 1 | Description Line 2 |
|---|---|---|---|---|---|---|
| UserID: JoeBob (New Ad) | | | | | | |
| Edit | 1234 | ad99 | Joe's Plumbing | Active | Good plumbers for you to fix your leaks | Free consultation with call |
|  | 1233 | ad98 | Bob's Pest Control | Paused | Get rid of your pests | 5% off for first time customer |
| UserID: MaryLou (New Ad) 2053 | | | | | | |
|  | 8888 | lst1 | Mary's Cleaners | Active | We clean houses | Free estimates |
| Delete | 7777 | lst2 | Lou's Pizza | Active | Best Deep Dish Pizza | $2 off an large pizza |
|  | 7778 | lst3 | Mo's Pizza | Pending | Best Deep Dish Pizza | $2 off an large pizza |
|  | 7779 | lst4 | Curly's Pizza | Paused | Best Deep Dish Pizza | $2 off an large pizza |
|  | 7780 | lst5 | Oliver's Pizza | Active | Best Deep Dish Pizza | $2 off an large pizza |
|  | 7781 | lst6 | Cheech's Pizza | Advertiser Paused | Best Deep Dish Pizza | $2 off an large pizza |

[ Update Ads ] 2051

View Ad Guidelines
View Bids by Category and Keywords

FIG. 24

Edit/Delete Ads

| Action | Listing ID | Ad ID | Business Name | Ad Status | Logo Image Name |
|---|---|---|---|---|---|
| UserID: JoeBob | | | | | |
| Edit | 1234 | ad99 | Joe's Plumbing | Active | Bar.jpeg ▽ |
| | 1233 | ad98 | Bob's Pest Control | Paused | Foo.gif |
| | | | | | Bar.jpeg |
| UserID: MaryLou | | | | | Foobar.gif |
| | 8888 | lst1 | Mary's Cleaners | Active | |
| Delete | 7777 | lst2 | Lou's Pizza | Active | |
| | 7778 | lst3 | Mo's Pizza | Pending | |

View Ad Guidelines

View Bids by Category and Keywords

Upload Logo Files

Currently available files:

Foo.gif (preview)
Bar.gif (preview)
Foobar.gif (preview)

[ Update Ads ]

Upload Logo Image

Currently available files:

Foo.gif (preview)
Bar.gif (preview)
Foobar.gif (preview)

Upload New file: [_____] [ Browse ]

[ Upload ]

FIG. 26

View Bids by Category and Keywords

Enter a search term to see the categories which it matches as well as the top 5 max price per call bids of listings in the category Search Term: | Mortgage | View View Bid Prices for Specific Service Area

View Bids by Category and Keywords

Enter a search term to see the categories which it matches as well as the top 5 max price per call bids of listings in the category Search Term: Mortgage Address:

City:

State: -Select State-

Zip:

Service Area: -Select Service Area -    2085

View

FIG. 28

Matching Categories:

| | Category | Top Bids |
|---|---|---|
| ☑ | Mortgage Banks | $60.00  $50.99  $20.00  $18.00  $15.00 |
| ☐ | Mortgage Brokers | $85.00  $70.00  $60.00  $55.55  $40.00 |

2111

Related Categories: related categories do not map to the search term you entered, but can be relevant to your product

| | Category | Top Bids |
|---|---|---|
| ☐ | Banks and Credit Unions | $60.00  $50.99  $20.00  $18.00  $15.00 |
| ☐ | Mortgage Refinance Specialists | $85.00  $70.00  $60.00  $55.55  $40.00 |

Top Bids in Selected Categories

| Edit/Delete Ads ||||||
|---|---|---|---|---|---|
| Action | Listing ID | Ad ID | Business Name | Ad Details ||
| UserID: JoeBob ||||||
| Edit | 1234 | ad99 | Joe's Plumbing | Best plumber's In Town! Can get your clogs fixed in under 20 minutes or the visit is free! | Rich text editor |
| | 1233 | ad98 | Bob's Pest Control | | Rich text editor |
| UserID: MaryLou |||||  2113 |
| | 8888 | lst1 | Mary's Cleaners | | Rich text editor |
| Delete | 7777 | lst2 | Lou's Pizza | | Rich text editor |
| | 7778 | lst3 | Mo's Pizza | | Rich text editor |
| | 7779 | lst4 | Curly's Pizza | | Rich text editor |
| | ◁ | □ | | | ▷ |

View Ad Guidelines

View Bids by Category and Keywords                    Update Ads

FIG. 32

One of your ad updates contains an error. See the result column for more details about the error. You can make changes and click update ads to try again.

| Edit/Delete Ads | | | | | | | |
|---|---|---|---|---|---|---|---|
| Action | Result | Listing ID | Ad ID | Business Name | ription | Description Line 2 | Bid Price |
| UserID: JoeBob | | | | | | | |
| Edit | Success | 1234 | ad99 | Joe's Plumbing | plumbers for you to ur leaks | Free consultation with call | 3.99 |
| | | 1233 | ad98 | Bob's Pest Control | d of your pests | 5% off for first time customer | 3.95 |
| UserID: MaryLou | | | | | | 2121 | Error – Bid Price Below Minimum |
| Edit | Error | 8888 | lst1 | Mary's Cleaners | lean houses | Free estimates | 1.99 |
| Delete | Success | 7777 | lst2 | Lou's Pizza | Deep Dish Pizza | $2 off an large pizza | 5.51 |
| | | 7778 | lst3 | Mo's Pizza | Deep Dish Pizza | $2 off an large pizza | 2.01 |
| | | 7779 | lst4 | Curly's Pizza | Deep Dish Pizza | $2 off an large pizza | 2.01 |
| | | 7780 | lst5 | Oliver's Pizza | Deep Dish Pizza | $2 off an large pizza | 2.01 |
| | | 7781 | lst6 | Cheech's Pizza | Deep Dish Pizza | $2 off an large pizza | 2.01 |

View Ad Gridlines
View Bids by Category and Keywords

Update Ads   Cancel

FIG. 33

| | Ad ID | Max Price Per Call | Ad Status | Top 5 Competitors' Max Price Per Call | | | | |
|---|---|---|---|---|---|---|---|---|
| ☐ | lst1 | $6.00 | Advertiser Paused | $6.00 | $2.01 | $2.00 | $2.00 | $2.00 |
| ☑ | lst2 | $3.00 | Advertiser Paused | $3.00 | $2.01 | $2.00 | $2.00 | $2.00 |
| ☑ | lst3 | $2.01 | Active | $2.05 | $2.04 | $2.03 | $2.02 | $2.01 |
| ☐ | lst4 | $2.02 | Active | $2.05 | $2.04 | $2.03 | $2.02 | $2.01 |
| ☐ | lst5 | $2.03 | Active | $2.05 | $2.04 | $2.03 | $2.02 | $2.01 |
| ☐ | lst6 | $2.00 | Active | $2.00 | $2.00 | -- | -- | -- |

Ad Manager — View the details of an ad by click on its name below. You can also easily modify one or more ads by selecting the ads and then choosing the desired action. You can also create one or more new ads.

Buttons: Edit Ads (2133), Delete Ad (2135), Edit Max Price Per Call (2137), Activate (2141), On Schedule (2143), Pause (2145). Checkbox marker 2131.

FIG. 34

Create Ad

Create Ads Inline for User

User Name: [____] (2151)
Password: [____] (2153)
[Create Ads] (2155)

Download Ad Creation Spreadsheet  [Download] (2157)

Upload Completed Ad Creation Spreadsheet
[____] (2163)  [Browse] (2161)  [Upload] (2159)

FIG. 35

Select Users and Fields

Select the users who's user info you would like to edit.

| Available Users | | Selected Users |
|---|---|---|
| akhouri | Add → | andrewl |
| alfredo | ← Remove | |
| amy | | |
| andrea | | |

Add User Not on List

User Name: [_____]   Add →

Password: [_____]

Select the field(s) you want to edit: (select all)

User Login: (select all)
        ☐ User Name      ☐ Password      ☐ PIN

User Contact Info: (select all)
        ☐ Address      ☐ Company Name      ☐ Email
        ☐ Name      ☐ News and Offers      ☐ Phone

Account Payment Info: (select all)
        ☐ Credit Card      ☐ Post-Pay Budget      ☐ Pre-Pay Budget
        ☐ Pre-Pay One Time Deposit

[Edit Users]

FIG. 36

METHODS AND APPARATUSES TO MANAGE MULTIPLE ADVERTISEMENTS

The present patent application is related to: U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; U.S. patent application Ser. No. 11/095,853, filed Mar. 30, 2005 and claimed priority from Provisional U.S. Patent Application 60/653,661 filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; and U.S. patent application Ser. No. 10/679,982, filed Oct. 6, 2003. The disclosure of the above mentioned applications are incorporated herein by reference.

TECHNOLOGY FIELD

At least some embodiments of the present invention relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Systems and methods to facilitate the management of multiple pay for performance advertisements are presented herein. Some embodiments are summarized in this section.

In one embodiment, a method includes: generating a user interface to show a plurality of advertisements simultaneously and to allow editing of any of the plurality of advertisements; and updating an advertisement database according to input received in the user interface. In one embodiment, the each advertisement of the plurality of advertisements is charged for according to a price bid in response to a communication lead generated from the advertisement. In one embodiment, the plurality of advertisements are selected from advertisements of more than one user.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 8A shows an example of a user interface that may be presented to a user during advertisement creation, in accordance with one embodiment of the present invention.

FIG. 9 shows an example of a search engine result page, which includes an advertisement generated, in accordance with one embodiment of the present invention.

FIG. 22 illustrates a page showing the statistics of advertisements of a selected plurality of users according to one embodiment of the present invention.

FIG. 23 illustrates the selection of users and fields for the viewing and editing of selected fields of the advertisements of the selected users according to one embodiment of the present invention.

FIG. 24 illustrates a user interface which allows the editing of advertisements of one or more users according to one embodiment of the present invention.

FIG. 25 illustrates a user interface for specifying logos of advertisements according to one embodiment of the present invention.

FIG. 26 illustrates a user interface for uploading a logo file according to one embodiment of the present invention.

FIGS. 27-31 illustrate example interfaces for viewing top price bids according to one embodiment of the present invention.

FIG. 32 illustrates the cells which accept contents in a Rich text format according to one embodiment of the present invention.

FIG. 33 illustrates an interface that contains cells that indicate the result of a set of previously submitted updates according to one embodiment of the present invention.

FIG. 34 illustrates another interface for the management of certain aspects of multiple advertisements according to one embodiment of the present invention.

FIG. 35 illustrates an interface for the creation of one or more advertisements for a specified user according to one embodiment of the present invention.

FIG. 36 illustrates a user interface for the selection of users and fields for the editing of user account information according to one embodiment of the present invention.

DETAILED DESCRIPTION

In the following description, for purposes of explanation, numerous specific details are set forth in order to provide a thorough understanding of the description. It will be apparent, however, to one skilled in the art that the techniques can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
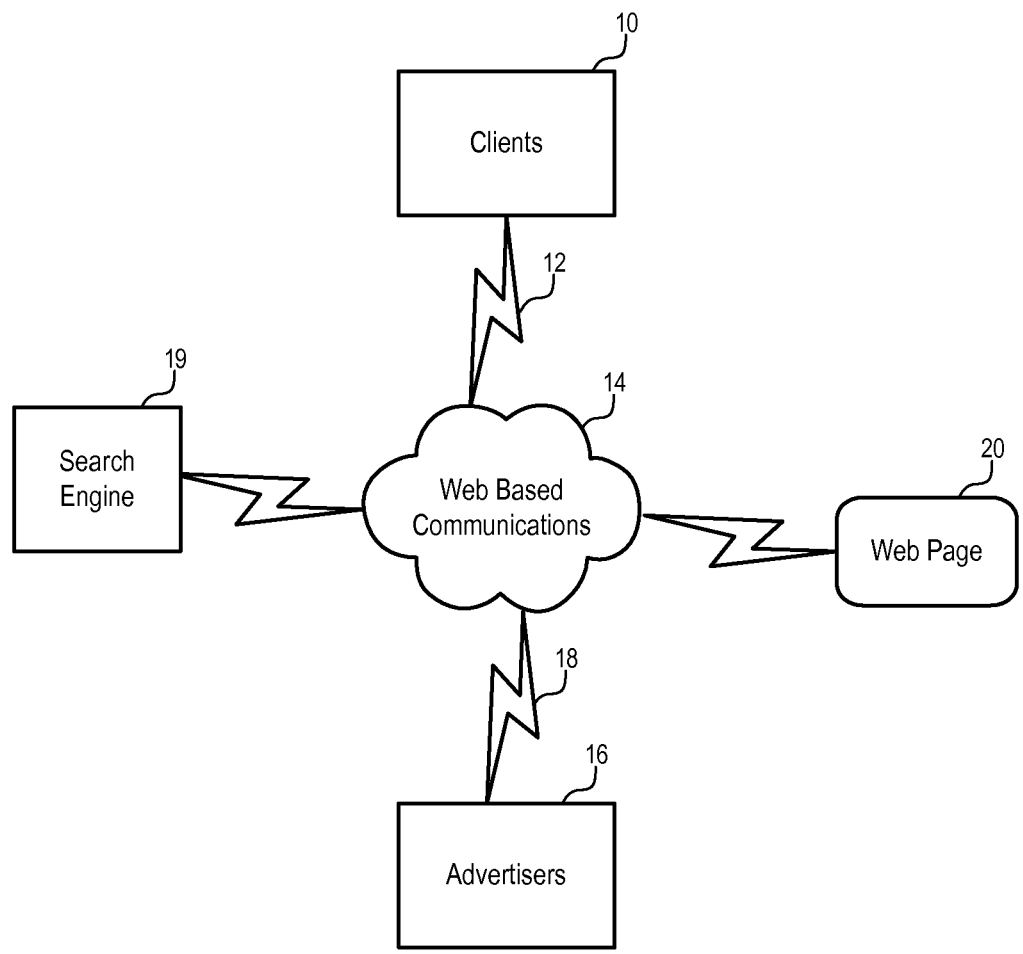
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
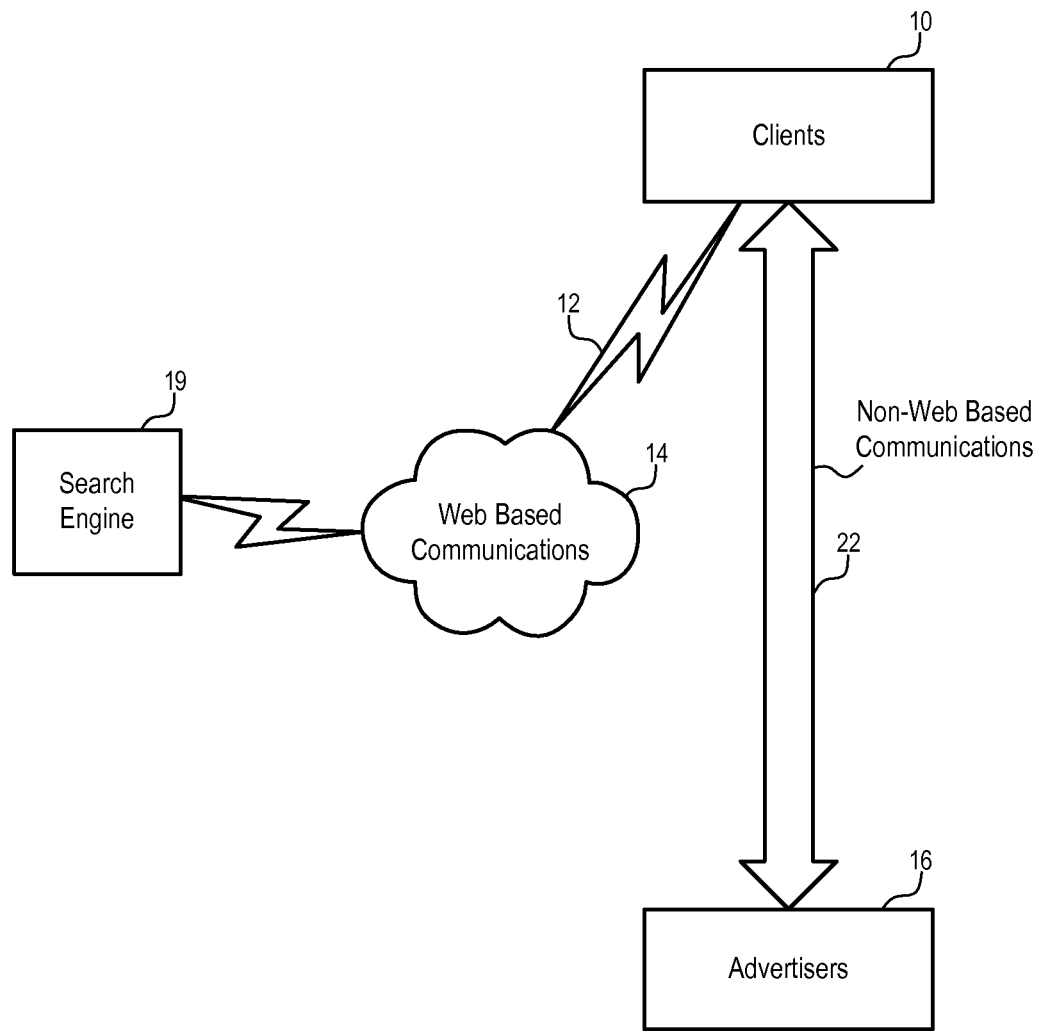
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
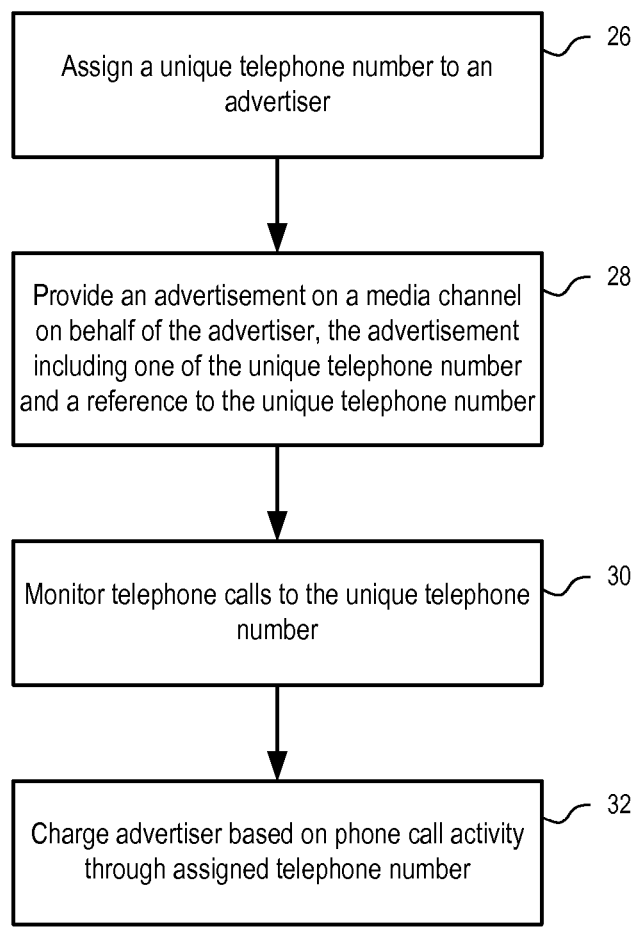
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
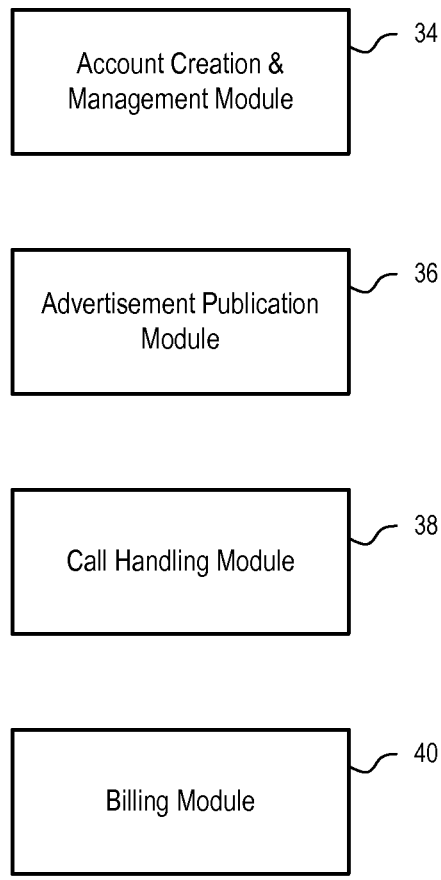
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
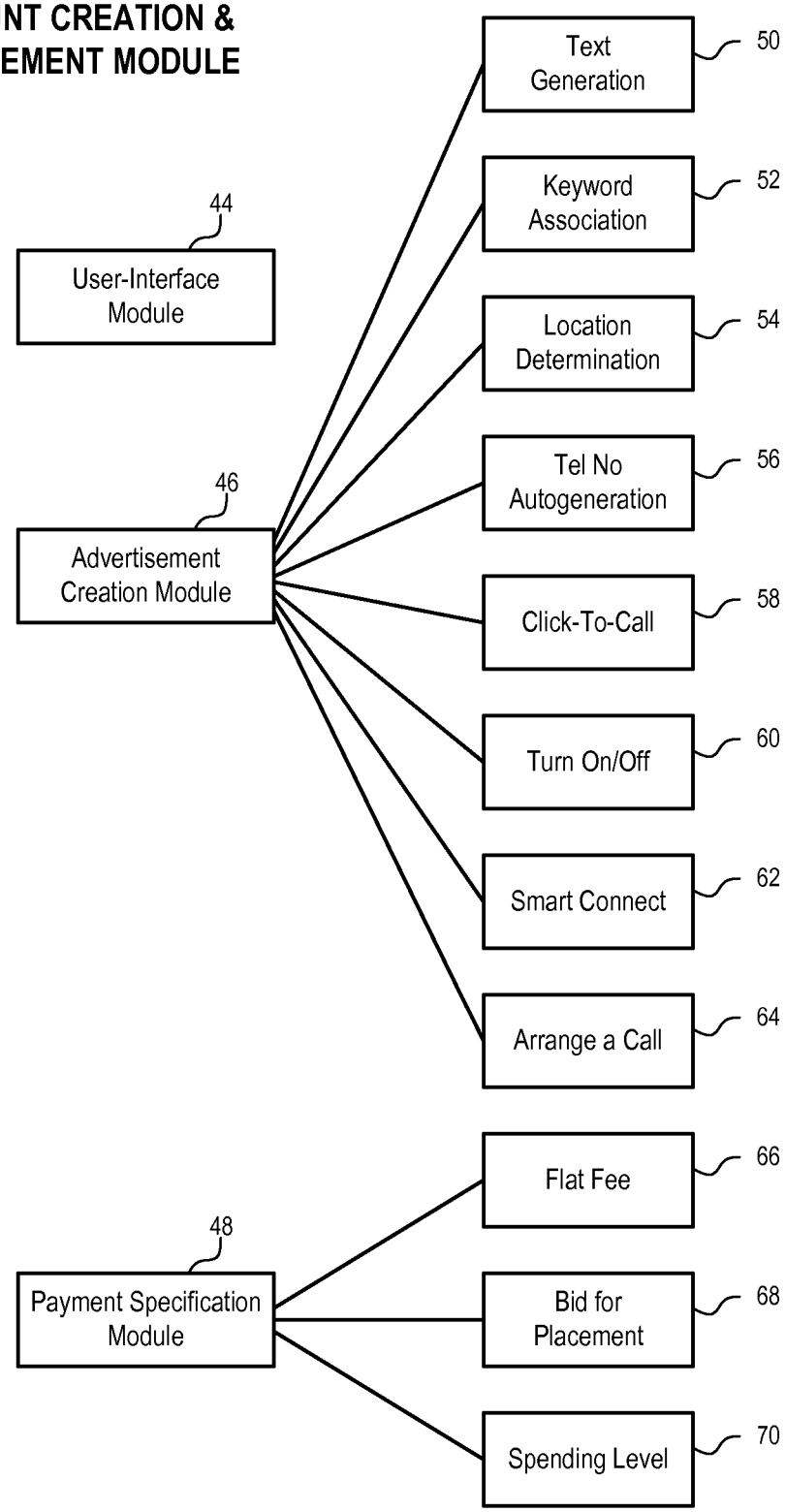
FIG. 5 illustrates the Account Creation and Management module of the system, in greater detail.
Figure 8B:
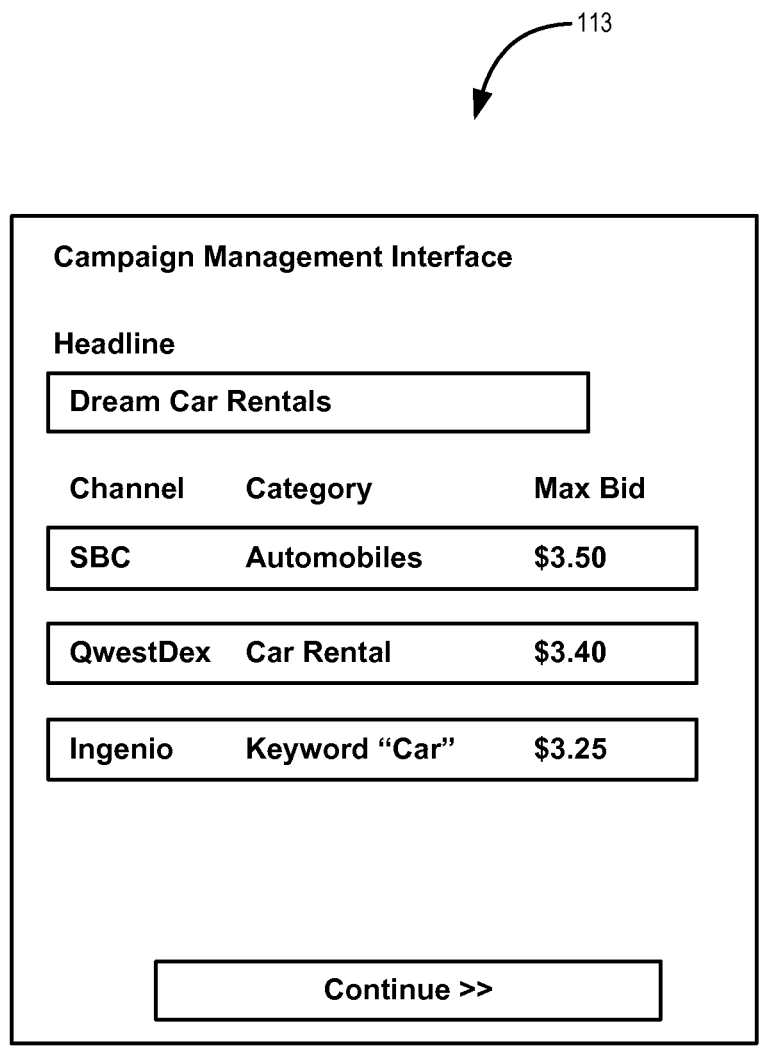
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
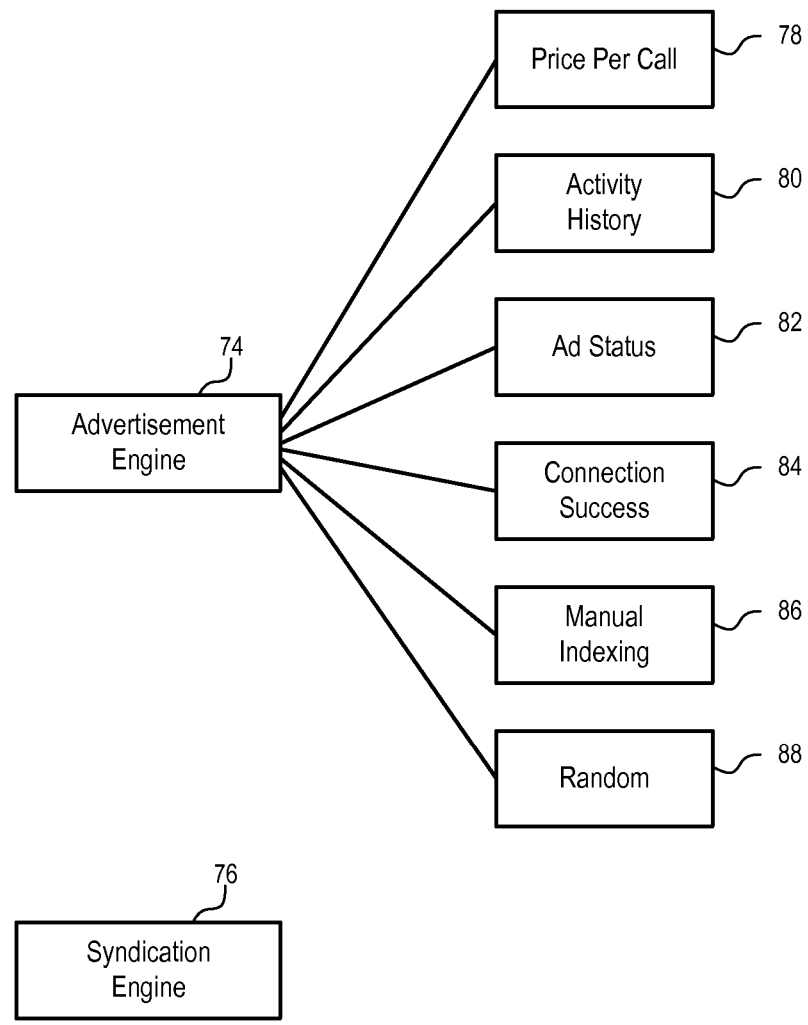
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
| --- | --- | --- |
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic

82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
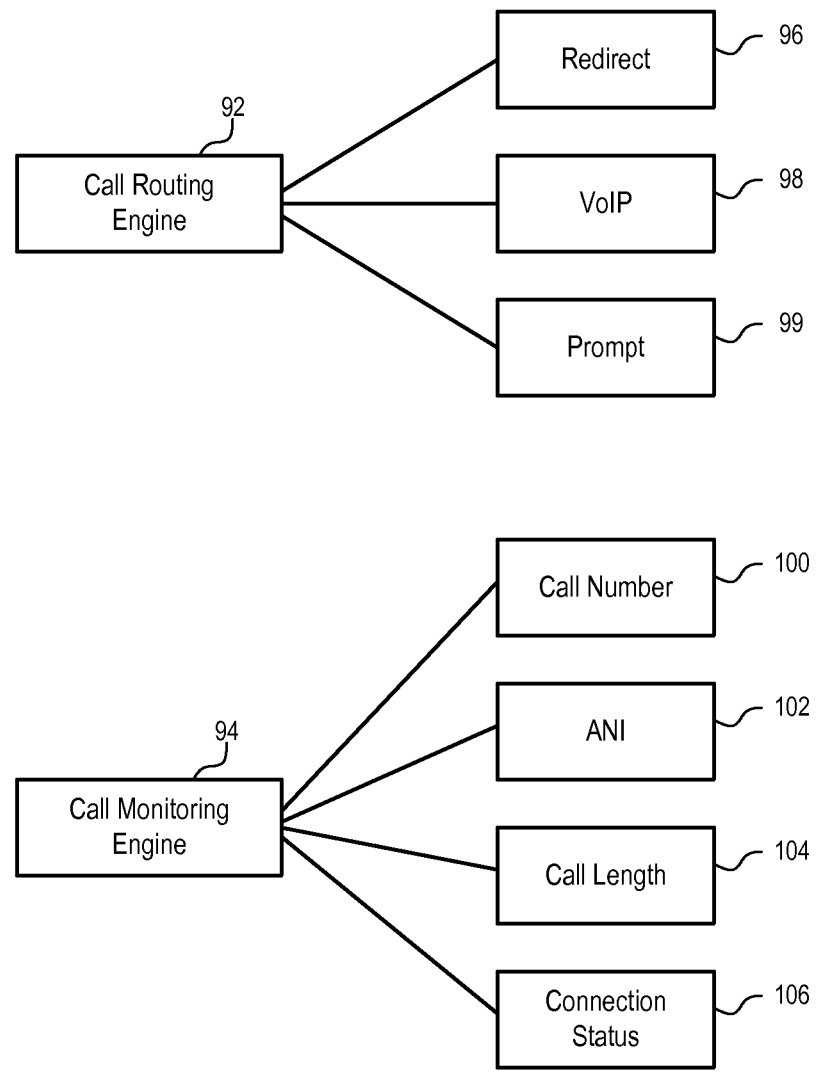
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
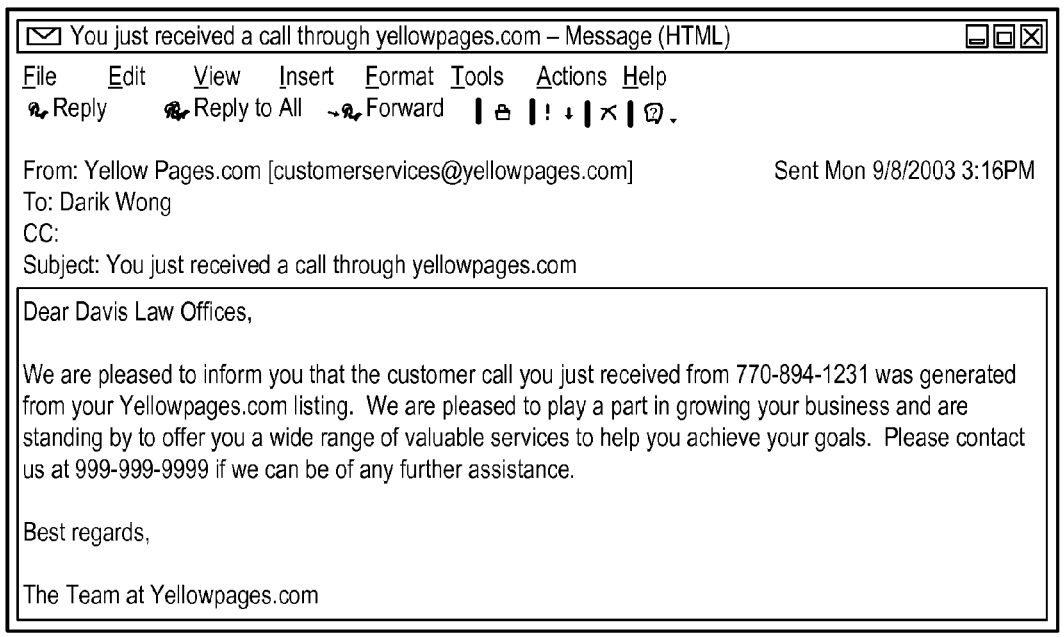
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
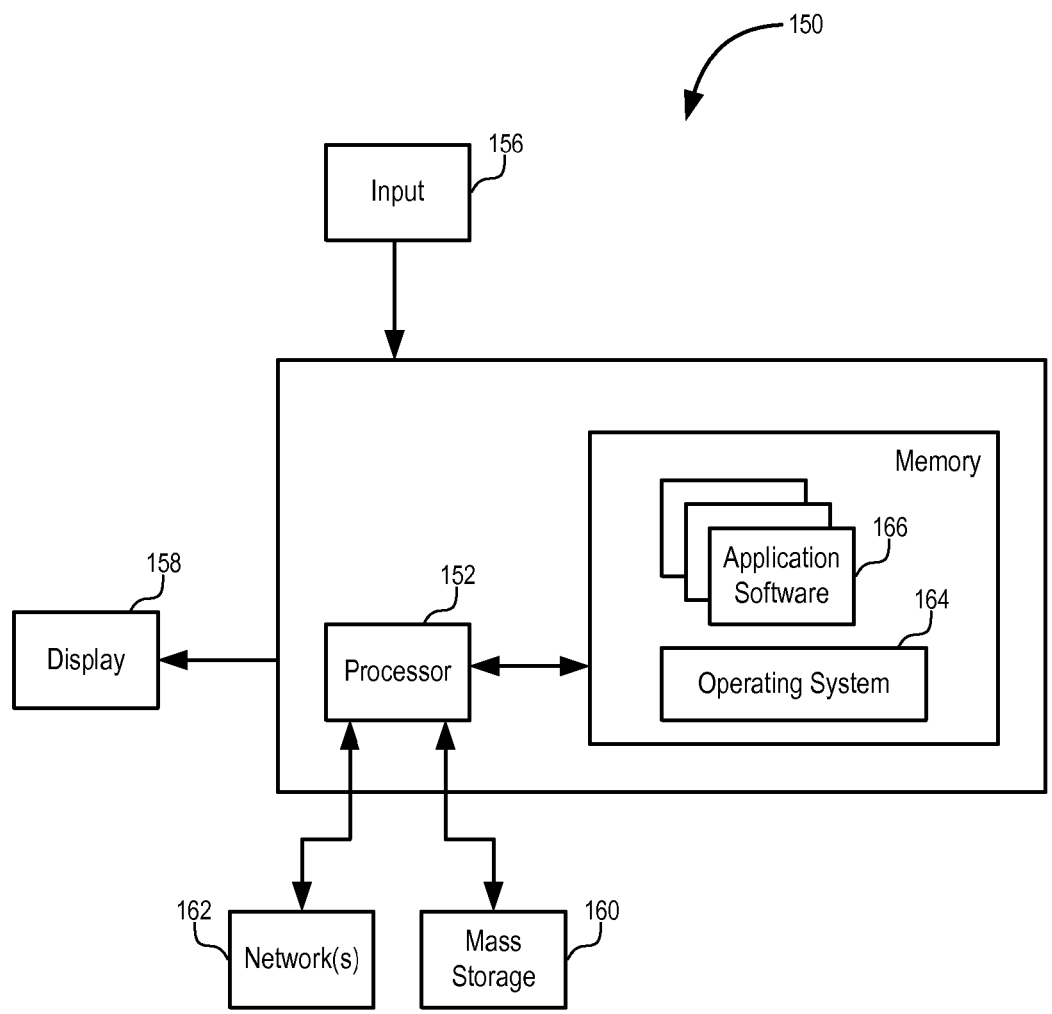
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
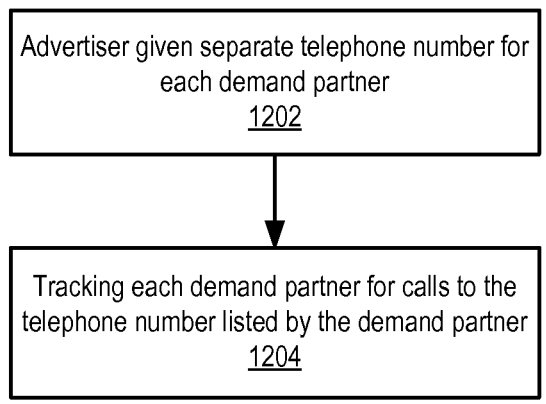
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
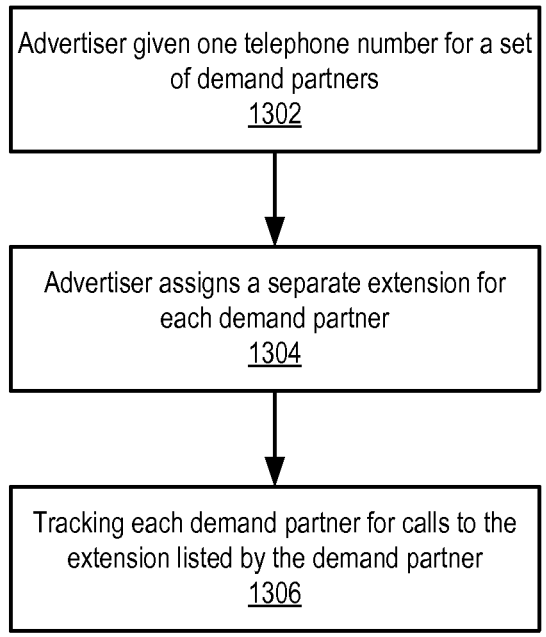

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800)new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
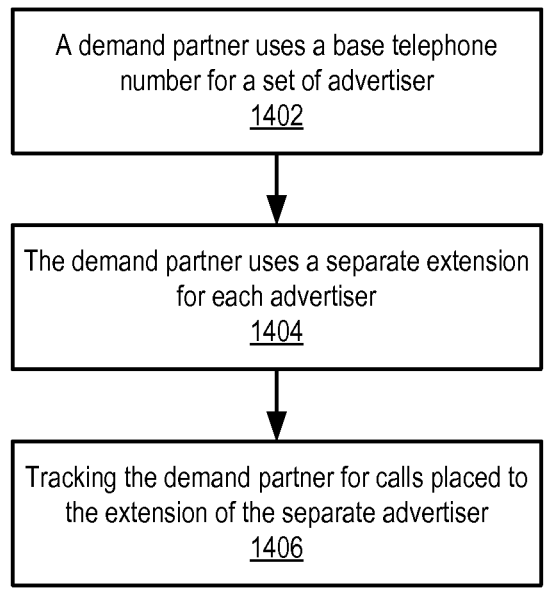

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
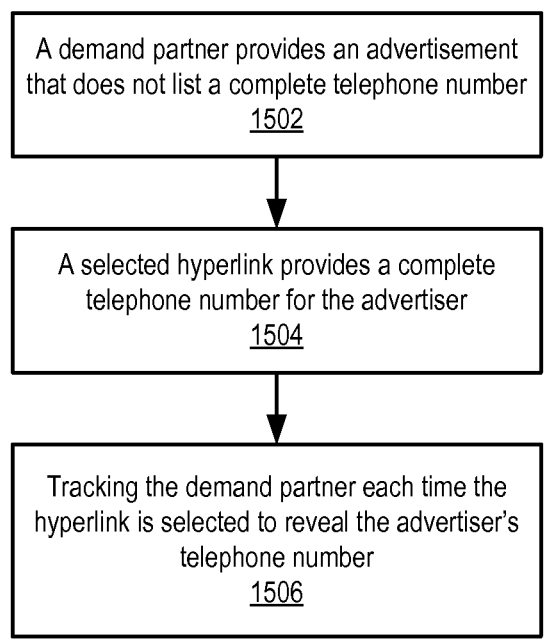

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
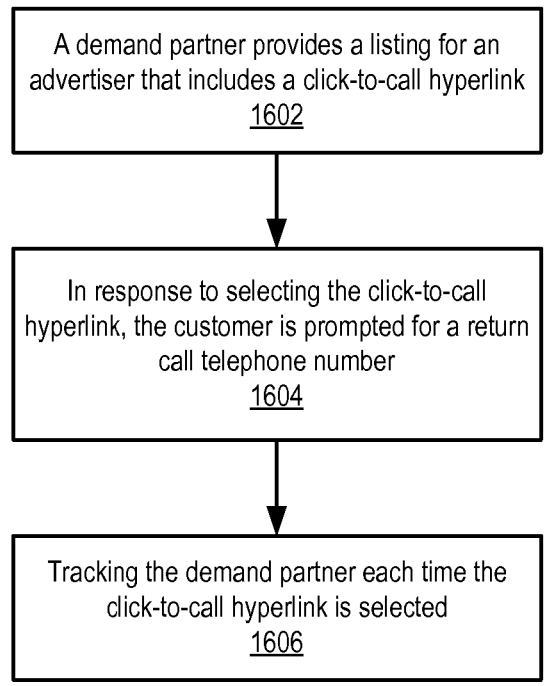

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
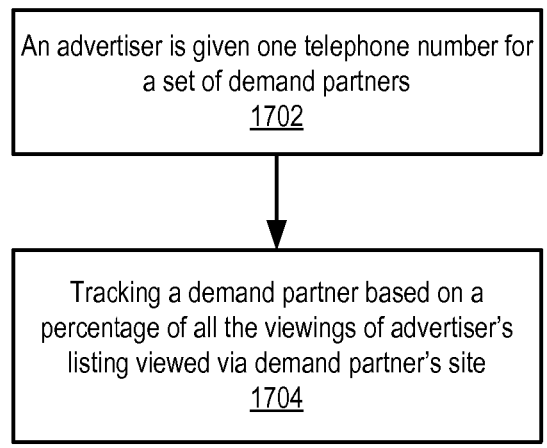

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
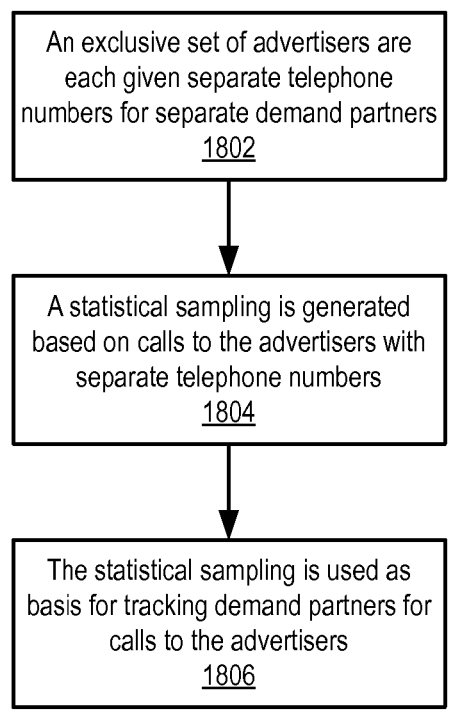

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
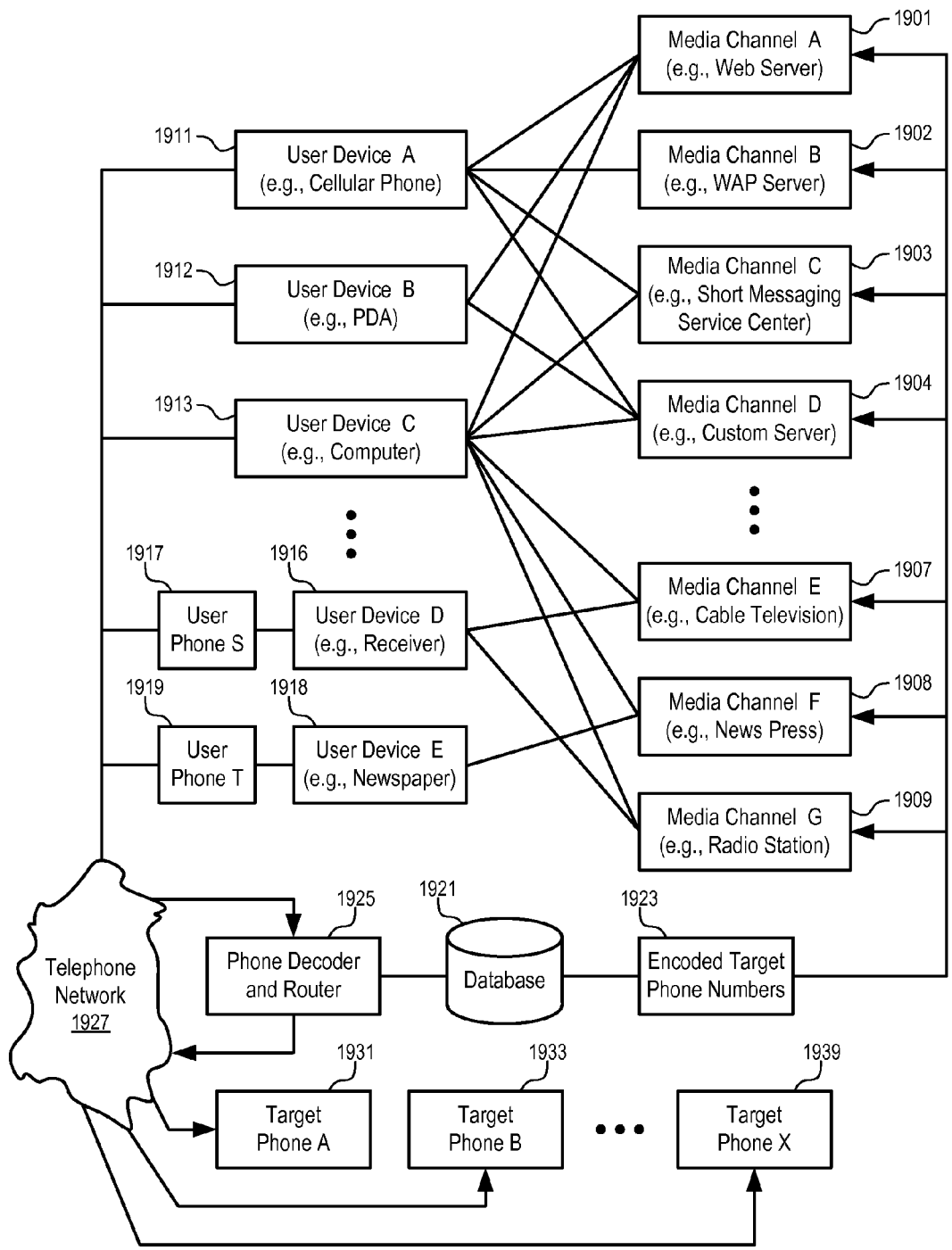
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel F (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

In one embodiment, a tool is provided to facilitate the easy creation, editing and management of multiple advertisements (listings) which may be from multiple user accounts. For example, the tool allows a user to update budgets of one or more user accounts, view spending statistics of user accounts, and generate reports showing status, statistics and activities of user accounts. For example, the tool allows a user to create listings, update listings, view listing statistics, and generate reports for one or more selected listings.

In one embodiment, there are different types of users who may edit an advertisement listing, such as an advertiser who creates a user account on a server and creates one or more listings in the user account, an agency who manages listings on behalf of one or more advertisers who have different user accounts, an account manager who manages accounts and listings on behalf of agencies and/or individual advertisers.

Figure 20:
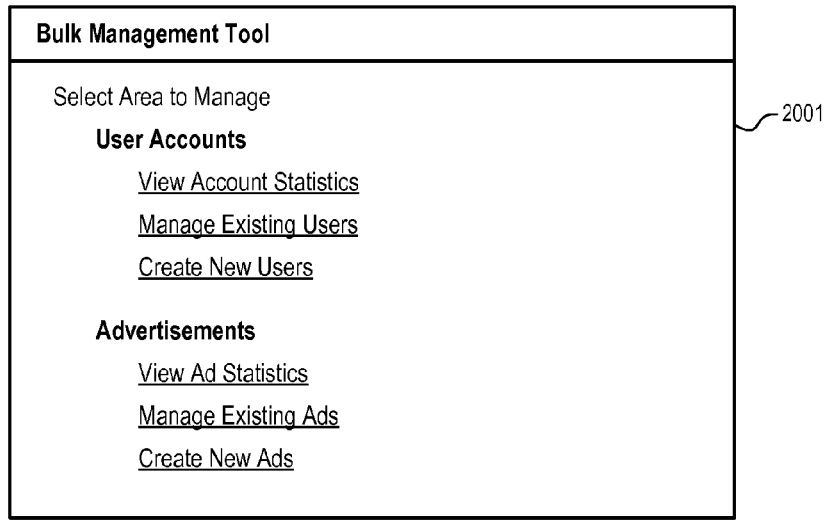
FIG. 20 illustrates a menu page for the editing of multiple advertisements according to one embodiment of the present invention.

In one embodiment, after a user is authenticated (e.g., via user name and password and/or PIN (personal identification number)), a menu page is presented to the user, as illustrated in FIG. 20. For example, after signing in, an account manager may create or edit accounts and/or advertisements.

In FIG. 20, the menu page (2001) allows the user to select an area to manage. For example, the user may select to manage the user accounts or the advertisements. To manage user accounts, the user may select to view account statistics, to manage existing users, or to create new users, via the corresponding links presented in the menu page (2001) under the heading "User Accounts". To manage advertisements, the user may select to view advertisement statistics, to manage existing advertisements, or to create new advertisements, via the corresponding links presented in the menu page (2001) under the heading "Advertisements".

Figure 21:
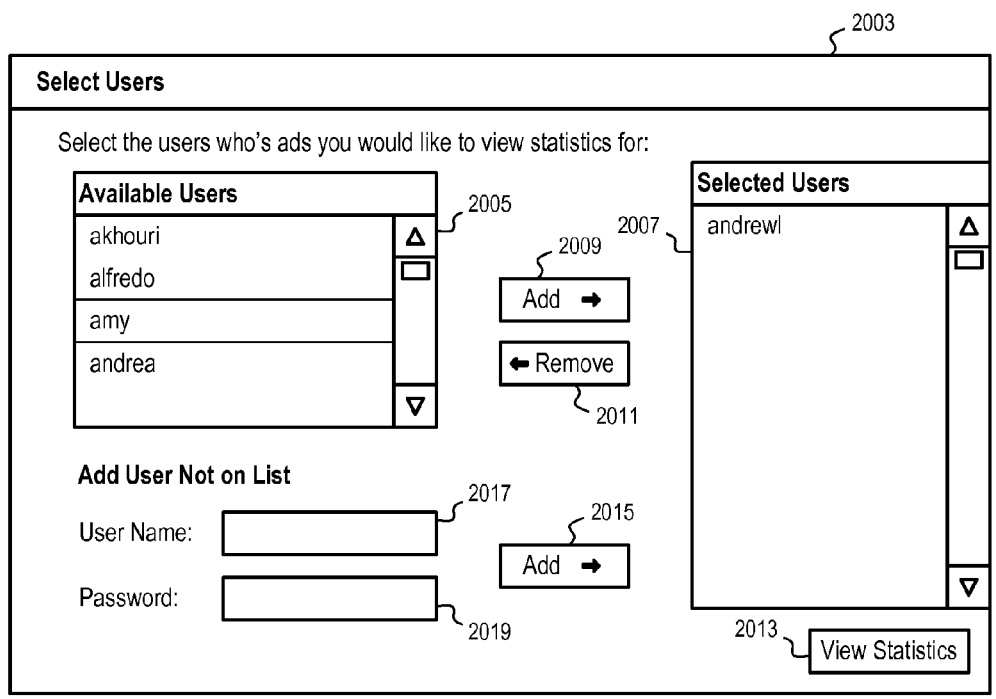
FIG. 21 illustrates an interface for the selection of one or more users for the viewing and/or editing of multiple advertisements according to one embodiment of the present invention.

In one embodiment, when the link to view account statistics (or the link to view advertisement statistics) is selected, a page as illustrated in FIG. 21 is presented to select users.

In FIG. 21, the page (2003) to select users include a panel (2007) showing the selected user and a panel (2005) showing a list of users the current user of the page (2003) has access to.

A user can be selected from the "available users" panel (2005) by highlighting the entry that shows the name of the user and selecting the add button (2009) to add the user to the "selected users" panel (2007). In one embodiment, after a user is selected into the "selected users" panel (2007), the entry for the selected user is removed from the "available users" panel (2005). One or more users can be selected into the "selected users" panel (2007).

In one embodiment, an entry in the "selected users" panel (2007) can also be moved back into the "available users" panel (2005) through 1) selecting the entry in the "selected users" panel (2007) and then 2) selecting the remove button (2011).

In FIG. 21, a user that is not already in the selection panels (2005 and 2007) can also be added and selected. For example, after the user name and password of the selected user are entered into entry boxes (2017 and 2019), the add button (2015) can be selected. If the user name and password are correct, an entry is added to the "selected users" panel for the user.

The button (2013) in FIG. 21 can be selected to view statistics of the advertisements of the users listed in the "selected users" panel (2003).

FIG. 22 illustrates a page showing the statistics of advertisements of a selected plurality of users. In FIG. 22, the advertisement statistics are displayed for users JoeBob and MaryLou in the page (2031). The statistic data displayed includes the total impression (the number of presentations made) during the past period (e.g., 7 days), the average conversion rate, the average price per call, the current maximum price per call, the average position of the advertisement in search results, etc. The vital statistics of the advertisements can be displayed to assist the user in determining which advertisements may need edit.

In FIG. 22, the statuses of the advertisements are also displayed. An advertisement may be active, paused because of low conversion, warned because of low conversion, paused for further editing, or paused by the advertiser, etc.

In FIG. 22, a column of check boxes (e.g., 2033) are provided to allow the selection of individual advertisements for editing. In one embodiment, more than one advertisements of one or more of the users can be selected from the list. After the "Edit Selected Ads" button (2035) is selected, the advertisements as selected using the check boxes can be displayed for editing.

In FIG. 22, the advertisements are grouped by users; and the user identifier for a group of advertisements is placed above of the rows of statistic data for the advertisements. The business names of the advertisements and the advertisement identifiers are displayed to identify the advertisements to the user.

In one embodiment, a user can further select the fields for the viewing or editing of a subset of attributes of the advertisements.

For example, FIG. 23 illustrates the selection of users and fields for the viewing and editing of selected fields of the advertisements of the selected users. Users may be selected into the "selected users" panel (2007) from the "available users" panel (2005) via the "Add" button (2009), or via the "Add" button (2015) for the correctly specified user name (2017) and password (2019).

In one embodiment, an advertisement includes contact information, such as address, fax, phone, etc. The advertisement further includes basic display, such as business name, bid price, categories, description, service area, status, etc. The advertisement further includes optional attributes, such as advertisement details, coupon, logo, callable hours, payment methods, etc.

In FIG. 23, the fields for the advertisements are arranged in groups for advertisement contact info, advertisement basic display, and advertisement detailed display. The attributes for each group can be conveniently selected via a link (e.g., link 2049 for attributes in the "Ad Contact Info" group). The link (2047) can be selected to check all of the attributes of all the groups. A user can also individually check the boxes (e.g., 2045 for the "Phone" attribute) to select the corresponding fields.

After the users and fields are selected, a user interface is displayed for the view and editing of selected fields of the advertisements of the users, when the button (2043) is selected.

FIG. 23 illustrates an example when all the advertisements of the selected users are being requested for viewing and/or editing of the selected fields of the advertisements. Alternatively, a user may select a subset of the advertisements via the check boxes in FIG. 22). When the "Edit Selected Ads" button (2035) in FIG. 22 is selected, an interface is displayed to provide the user with options to select a subset of attributes for viewing and editing. For example, when the "Edit Selected Ads" button (2035) in FIG. 22 is selected, the field selection portion (2042) of the interface illustrated in FIG. 23 is displayed. Alternatively, the entire interface (2041) in FIG. 23 is presented to allow the user to select the fields/attributes when the "Edit Selected Ads" button (2035) in FIG. 22 is selected.

By allowing a user to select the particular fields that they want to update, a custom view of the selected users' advertisements can be presented to the user according to the need of the user.

In one embodiment, a user can select a set of fields to define a custom view. The definition of the custom view is saved. Subsequently, the user can select the custom view to conveniently select the set of fields. In another embodiment, a set of advertisements of one or more users can be selected and saved as a custom view, which can be subsequently loaded. In a further embodiment, a set of fields of a set of advertisements of one or more users can be defined and saved as a custom view, which can be subsequently loaded. In a further embodiment, the listing and user level statistics are configurable. Thus, a user can create custom statistic monitors. For example, a user can create and store custom views of listing and user level statistics to allow for custom monitoring.

FIG. 24 illustrates a user interface which allows the editing of advertisements of one or more users. In FIG. 24, an action column is provided to allow a user to specify the types of changes to the advertisements. For example, selected fields of an advertisement can be edited. For example, the advertisement can be deleted. In one embodiment, the action is specified by entering the keywords, such as "Edit" or "Delete". Alternatively, a selection box can be used to allow the selection of one action from a set of available actions.

In one embodiment, the changes/edits made in the user interface are cached. When the "Update Ads" button (2051) is selected, the changes cached in the user interface are submitted to the server for committing into an advertisement database.

In one embodiment, the user interface as illustrated in FIG. 24 includes data entry information. For example, when a cursor is positioned over a data entry cell for a period of time, a label is displayed to provide information on the cell, such as what the cell is for, whether the cell is a required attribute, the limit on the characters permitted in the cell, etc. In one embodiment, the interface performs an inline validation when the keyboard focus is moved out of a cell. Inline validation can be used to check the content in the cell for proper format and length. In one embodiment, editable cells have indicators that when clicked on cause modal windows to be displayed for inline editing without posting back to the server; and client side validation of the data is performed when the inline editing is completed (e.g., when the keyboard focus is moved out of the cell). In one embodiment, the content of the cells can be copied and pasted into another editable cell. In a further embodiment, a menu option is available to perform one or more steps of undo actions. In one embodiment, the user interface is implemented using ATLAS, which is a set of extensions to ASP.NET for implementing Asynchronous JAvaScript and XML (AJAX) functionality.

In one embodiment, the user interface includes frozen cells, which are presented for display but not for editing. These cells are presented for the user's reference when making edits and are thus locked.

Further, in one embodiment, the cells of an advertisement is locked if the corresponding action field does not have the value for editing. The cells are unlocked after the editing action is specified. For example, after the word "Edit" is entered into the action column for an advertisement, the cells corresponding to the attributes selected for editing become unlocked and editable. In one embodiment, the action field column is not used when the user interface is implemented via a web browser; and the action field column is used when the user interface is presented through a spreadsheet.

In one embodiment, some of the cells (e.g., the "detailed display" field of an advertisement) allow rich text formatting. For example, a user may use shortcut keys to format the text in a cell. For example, a user may request a pop up window that shows a rich text editor to format the text in the cell.

In one embodiment, the cells are color coded to indicate the editable cells and non-editable cells. In one embodiment, the cells are further color coded to identify the changed cells in which the content has been modified.

In one embodiment, the user interface is implemented as an applet embedded in a web page. In another embodiment, the user interface is implemented in HyperText Markup Language (HTML). In a further embodiment, the user interface is implemented as a spreadsheet for a stand along application, such as Excel.

In FIG. 24, the "Listing ID" column and the "Ad ID" column are displayed to identify the advertisements. In one embodiment, a "Listing ID" is an identifier assigned to the advertisement by the system; and an "Ad ID" is an identifier submitted by the advertiser at the time of the creation of the advertisement. These identifiers of an advertisement are not editable.

In one embodiment, an advertisement may be listed under one or more categories (e.g., up to 5 categories); and multiple columns (e.g., 5 columns) are provided for specifying the categories. The basic description of the advertisement may include two lines; and two columns are provides for specifying the basic description. A service area can be selected from a number of possible geographic areas that are defined based on the service address of the advertisement, such as the city of the service address, the state of the service address, a predetermined miles from the location defined by the zip code of the service address, etc.

In one embodiment, a coupon may include coupon headline, coupon description, coupon limitations and coupon expiration. Multiple columns are provided for editing of the coupons. Callable hours may include two columns for each day in the week, each of the column includes a drop down menu for the selection of the open time or the close time for that day.

In one embodiment, a group of attributes are presented in one column of cells. For example, the 5 categories of a listing can be presented in one cell; and the attributes for coupon (e.g., headline, details, limitations, expiration date) can be grouped into one column with one editing control.

In one embodiment, a user can modify an existing advertisement to create a new advertisement. For example, a user can specify "create" in the "Action" cell of the advertisement. When the advertisement is created based on an existing advertisement, the fields that are accessible in the user interface are copied from the existing advertisement to the new advertisement.

In one embodiment, a row of blank cells are provided for each selected user to allow the creation of a new advertisement for the user by filling in the blank cells. In one embodiment, when the row of blank cell is used for the creation of an advertisement, a further row of blank cells is automatically inserted to allow the creation of another advertisement.

In FIG. 24, a link (2053) is provided for the corresponding selected user shown in the interface. The link (2053) can be used to open an interface for the creation of a new advertisement for the selected user. The interface for the creation of one or more new advertisements can be one or more rows of blank cells, a modal window, a spreadsheet or a grid of cells, etc. In one embodiment, to create a new advertisement, the user is presented with an option of selecting an existing advertisement as a starting point; the data of the selected existing advertisements is used to automatically populate the corresponding fields of the new advertisement; and the user can selectively modify one or more fields to create the new advertisement.

FIG. 25 illustrates a user interface for specifying logos of advertisements according to one embodiment. In FIG. 25, a logo column is presented for the editing of the advertisements. Each cell can be used to associate a logo file with the advertisement. A link (2065) is provided to allow the user to upload one or more logo files to the server. A list (2067) of logo files that are currently available to the user of the interface is displayed, together with links to preview the logos. Alternatively, a version of the logos (e.g., logos with reduced size and resolution) can also be displayed with the corresponding names of the logo files in the list for currently available files.

In one embodiment, the available logo files include the logo files that have been uploaded in the current session and/or the logo files that are currently associated with the advertisements of the selected users. In one embodiment, after the logo files are uploaded to the server, the logo files are cached on the server for a period of time for the user; thus, the previously uploaded logo files are also available in the user interface. In one embodiment, the available logo files also include the logo files on the local file system that have been identified by the user as being available as logo files.

In one embodiment, when the keyboard focus is in one of the cells for logo image, a drop down menu (2061 and 2063) is presented. The drop down menu includes a list of options corresponding to the list of currently available logo files. A user can conveniently select one of the currently available logo files to specify the logo for the advertisement. Alternatively, the selection of the logo file can be implemented using a modular window. When the editable cell is selected, an indicator similar to icon (2061) is displayed for the presentation of a set of menu options for Edit, Copy, Paste, Revert, etc. When the "Edit" option is selected, a modular window is presented to allow the selection of a logo file from a list of currently available logo files.

In one embodiment, when the link (2065) is selected, a pop up window (or a separate layer) is displayed to show an interface for uploading logo files.

FIG. 26 illustrates a user interface for uploading a logo file. In FIG. 26, the file name of a logo file in the local file system can be specified by entering the name of the file on the local file system into the entry box (2073), or using a browser window (not shown in FIG. 26) to browser the local file system for selection. A browser window is displayed after the "Browse" button (2071) is selected. A browser window allows a user to browse the local file system for the selection of one or more files. When the files are selected using the browser window, the names of the selected files are entered by the interface into the entry box (2073).

After the names of the logo files in the local file system are specified, the "Upload" button (2075) can be selected to transmit the logo files from the local file system to the server.

In one embodiment, when the "Upload" button (2075) is selected, the logo files as specified in the entry box (2073) are not immediately uploaded to the server. The user interface stores the names of the logo files and adds the selected logo files into the list of currently available files. When the "Update Ads" button (2069) in FIG. 25 is selected, the interface determines the logo files that are used in the advertisements but have not yet been uploaded to the server and uploads the logo files that are needed for the advertisements to the server. Thus, the logo files that are not used for the advertisements are not uploaded to the server. In one embodiment, the interface keeps a record of the logo files that are on the local file system and that have been selected by the user as being available. Thus, in a subsequent session, these files on the local file system can be added to the list of currently available files based on the record.

In one embodiment, to assist a user in determining the price bid of an advertisement, the system allows a user to view top bids in categories based on keyword searches.

FIGS. 27-31 illustrate example interfaces for viewing top price bids according to one embodiment.

In one embodiment, advertisements are listed under different categories based on the services and/or products advertised. The system maintains a map of keywords that are associated with the categories. Further, in one embodiment, the system maintains a map of keywords that are related to the categories. When a keyword is received in a search request, the map of associated keywords and the map of related keywords can be searched to determine the matched categories and the related categories.

In FIG. 27, a user can enter a keyword/search term to see the categories that match the keyword/search term, and/or categories that are related to the keyword/search term. The top price bids in the matched categories and the related categories are then displayed to assist the user in determining a price bid for an advertisement.

In one embodiment, the search of top bids can be limited within a specific service area in which the advertisements are served. For example, when the link (2081) is selected, the interface as illustrated in FIG. 28 is displayed, which allows a user to specify a specific geographic area of service. In one embodiment, when the pop up window (or the layer) for the interface illustrated in FIG. 28 is requested in the context of a specific advertisement, the data related to the service area (e.g., address, city, state, zip and service area) are pre-populated according to the service area of the advertisement.

In one embodiment, predicted/estimated placement and/or traffic generated from advertisement are also presented in response to the search. For example, when the search is in the context of a specific advertisement, the position rank of the specific advertisement in the list of advertisements that meet the search criteria is also presented with an estimated communication leads that can be generated in a given time period. In one embodiment, based on the position rank of the specific advertisement, the likelihood of getting a communication leads from presenting the advertisement at the position rank can also be determined and presented.

In one embodiment, the drop down menu (2085) for the service area includes a set of options, such as "national", "city, region and state", "city and region", "city", "25 miles from the location defined by the zip code", "10 miles from the location defined by the zip code", "5 miles from the location defined by the zip code", "2 miles from the location defined by the zip code", etc.

Figure 29:
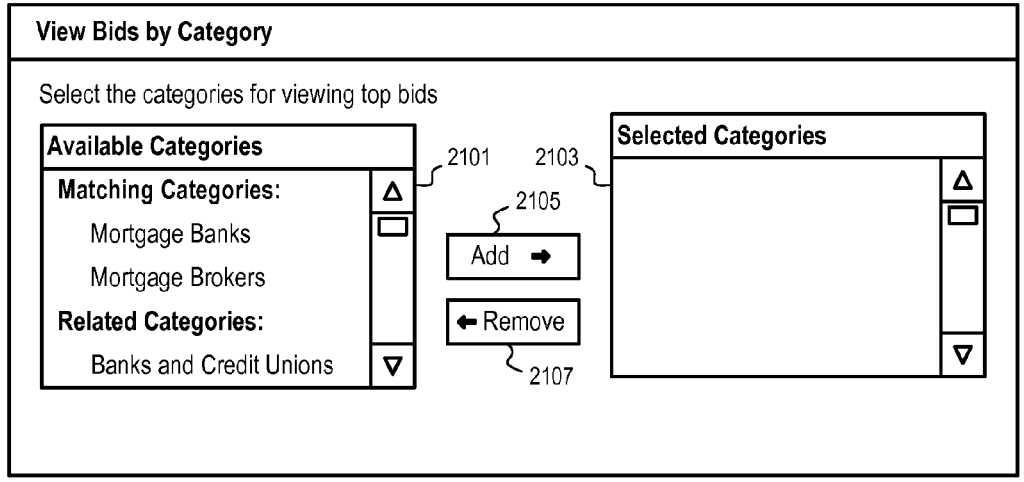

FIG. 29 illustrates an interface that shows the matching categories and related categories that are identified as a result of a search based on a submitted search term. The panel (2101) shows the categories for selection. A user can use the "Add" button (2105) to move a category highlighted in the "available Categories" panel (2101) into the "Selected Categories" panel (2103) and the "remove" button (2107) to move a category highlighted in the "Selected Categories" panel (2103) back into the "available Categories" panel (2101).

Figure 30:
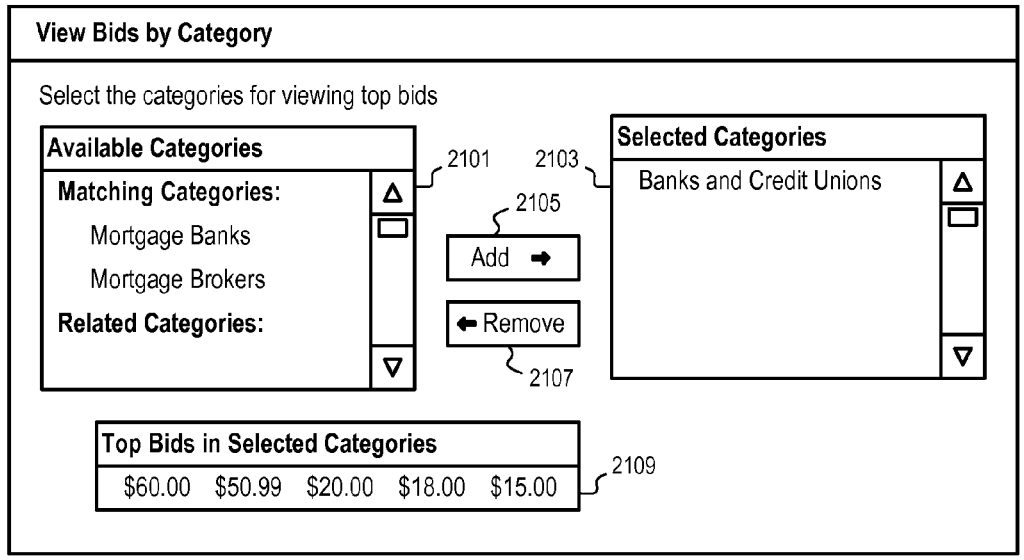

When one or more categories are in the "Selected Categories" panel (2103), the top prices bids of advertisements in the categories listed in the "Selected Categories" are displayed, as illustrated in FIG. 30. In FIG. 30, the top 5 bids are displayed. In one embodiment, the search for the top bids is limited to a specific service area (e.g., as specified using in the user interface illustrated in FIG. 28). In one embodiment, the interfaces in FIG. 28 and FIG. 30 are combined in one page.

FIG. 31 illustrates another interface that shows the matching categories, related categories, and the top bids. In FIG. 31, the top bids in each of the categories are displayed. Further, check boxes (e.g., 2111) can be used to select a set of one or more categories; and the interface determines the top bids for the selected set of categories.

FIG. 32 illustrates the cells for "Ad Details" which accept contents in a Rich text format. A link (e.g., 2113) can be used to invoke a pop up window (or a separate layer) for a Rich text editor which can be used to edit of the content of the cell. In one embodiment, keyboard shortcuts can also be used to format the content in the cells for "Ad Details".

FIG. 33 illustrates the interface that contains cells that indicate the result of a set of previously submitted updates (e.g., after the "Update Ads" button in FIG. 24, 25, or 32 is selected). In FIG. 33, the cells that contain errors are highlighted. When the cursor is positioned above a cell that contains an error, a flash window (2121) is displayed to explain the error. A user can further edit the advertisement using the interface. In one embodiment, when an advertisement is further edited, the "Result" cell for the advertisement is cleared (if the previous action on the advertisement is "Edit" or "Create"). In one embodiment, a cell that contains an error is highlighted yellow.

In one embodiment, the validations are performed in a modal window. When there is an error, the error message is also presented in the modal window.

FIG. 34 illustrates another interface for the management of certain aspects of multiple advertisements. In FIG. 34, an advertisement list is presented with key attributes, such as maximum price per call, status, top competitors' price bids, etc. A column of check boxes (e.g., 2131) are displayed, allowing the user to select a subset of the advertisement for editing.

For example, when the "Edit Ads" button (2133) is selected, a data grid similar to that illustrated in FIGS. 24, 25, 32 is presented. Alternatively, a user interface for the selection of specific fields can be presented to facilitate the construction of a custom data grid with selected fields of interest.

The set of selected advertisements, as specified using the column of check boxes, can be deleted using the "Delete Ads" button (2135). The status of the selected advertisements can be changed to active, on schedule, pause, using buttons 2141-2145 respectively.

The maximum price per call of the selected advertisements can be edited in a data grid that is presented in response to the selection of the button (2137).

Other buttons, designed for the editing of a pre-selected set of attributes (e.g., advertisement contact info), can also be added to the interface of FIG. 34.

FIG. 35 illustrates an interface for the creation of one or more advertisements for a specified user. In FIG. 35, the user for which the advertisements will be created is specified by entering the user name and password in entry boxes (2151 and 2153). Alternatively, selecting panels as illustrated in FIG. 21 can be used to select a user. Further, in one embodiment, multiple users can be selected for the creation of advertisements on behalf of the selected users.

In FIG. 35, the "Create Ads" button (2155) can be used to request a data grid for the creation of new advertisements. The data grid is presented in a spreadsheet format similar to those illustrated in FIGS. 24, 25 and 32. Alternatively, the "Download" button (2157) can be used to request a spreadsheet template for advertisement creation. In one embodiment, the spreadsheet is provided in a format that can be processed by a standalone application, such as Excel. A user can download the spreadsheet, populate the spreadsheet with data for the new advertisements using the standalone application and then upload the populated spreadsheet using the "Upload" button (2159). To upload the spreadsheet from the local file system, the name of the file can be specified into the entry box (2163) directly, or using a file browser window that is provided when the "Browse" button (2161) is selected.

In one embodiment, a spreadsheet can also be downloaded for the editing of multiple advertisements. For example, after the advertisements and fields to be edited are selected, a spreadsheet can be downloaded. The spreadsheet is pre-populated with the data that the server has for the selected fields of the selected advertisements. Thus, a user can edit the spreadsheet offline using a standalone application (e.g., Excel) and then upload the spreadsheet to submit changes made to the advertisements. In one embodiment, the downloaded spreadsheet file includes user interface definitions to facilitate easy access to the data fields.

In one embodiment, a database file can be downloaded for the editing of multiple advertisements. The database file can be processed using a standalone application, such as Access. The database file may contain user interface definitions, such that when the database file is opened in the standalone application, user interfaces are presented to allow the editing, creating, deleting of advertisements. The user interfaces may present the advertisements in a grid format (e.g., one row for one advertisement and one column for one field/attribute). Alternatively, the advertisements may be presented in a pages, each page for one advertisement.

FIG. 36 illustrates a user interface for the selection of users and fields for the editing of user account information. Users may be selected into the "selected users" panel (2207) from the "available users" panel (2205), or based on the user name and password that are correctly specified in the entry boxes (2217 and 2219).

In one embodiment, a user account includes user login information, such as user name, password, PIN (Personal Identification Number), etc. The user account further includes user contact information, such as address, name, company name, news and offers, email, phone, etc. The user account further includes account payment information, such as credit card, post-pay budget, pre-pay one time deposit, pre-pay budget, etc.

In FIG. 36, the fields for the advertisements are arranged in groups for user login, user contact info, and account payment info. The attributes for each group can be conveniently selected via a link (e.g., 2249). To select all of the attributes, the link (2247) can be selected. Alternatively, a user may individually select the check boxes (e.g., 2245) to select the corresponding fields.

After the users and fields are selected, a user interface is displayed for the view and editing of selected fields of the accounts of the users in a spreadsheet format, when the button (2243) is selected. Alternatively, a data file (e.g., a spreadsheet or a database file) can be downloaded for use with a standalone application (e.g., Excel or Access) to generate a user interface for the editing of user accounts. In one embodiment, a data file can also be used to create new user accounts.

Figure 37:
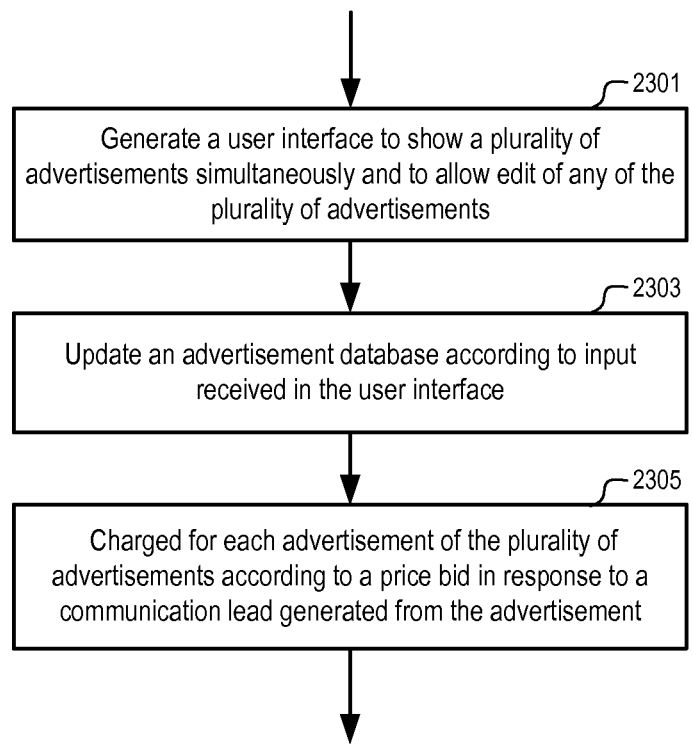
FIG. 37 shows a flow diagram of a method to facilitate the editing of multiple advertisements according to one embodiment of the present invention.

FIG. 37 shows a flow diagram of a method to facilitate the editing of multiple advertisements according to one embodiment. In FIG. 37, a user interface is generated (2301) to show a plurality of advertisements simultaneously and to allow edit of any of the plurality of advertisements. An advertisement database updated (2303) according to input received in the user interface. Each advertisement of the plurality of advertisements is charged for (2305) according to a price bid in response to a communication lead generated from the advertisement. In one embodiment, the communication lead is at least partially voice based, such as a telephone call from a customer to the advertiser.

In one embodiment, the user interface includes a HyperText Markup Language (HTML) document. The HTML document may include a spreadsheet showing a plurality of attributes of the plurality of advertisements.

In one embodiment, user input selecting one or more advertisement attributes is received prior to the generation of the user interface; and the user interface is generated to selectively include editable fields for the one or more advertisement attributes selected according to the user input.

In one embodiment, the plurality of advertisements are advertisements of more than one user, which are selected prior to the generation of the user interface.

In one embodiment, the changes to more than one of the plurality of advertisements are cached in the user interface and transmitted the changes to a server to update the advertisement database in response to one user indication to the user interface.

In one embodiment, after the changes are submitted to the server, a feedback is provided to indicate whether there is an error in updating the advertisement in response to input received in the user interface; and the user interface includes a field to indicate a status of a previous update to an advertisement and one or more fields to allow further edit of one or more attributes of the advertisement that is previously updated.

In one embodiment, a user interface is generated to allow the selection of more than one user. In one embodiment, statistics data of advertisements of the more than one user is displayed in a user interface to allow selection of a subset of the advertisements of the more than one user for edit. In one embodiment, a user interface is displayed to allow the selection of one or more advertisement attributes for edit of the subset of the advertisements.

In one embodiment, the user interface further allows selection of one or more advertisement attributes for edit of advertisements of the more than one user.

In one embodiment, the user interface includes a plurality of fields for associating image files with the plurality of advertisements, each of the fields providing a set of selection options to select one image file from a set of image files in a server. The set of selection options in the user interface are updated after receiving an uploaded image file at the server.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:

generating, by a server system, advertising content for a plurality of advertisements and storing the plurality of advertisements stored in an advertisement database of the server system, where:

a respective reference is assigned to each advertisement of the plurality of advertisements, the respective reference facilitating real time communication connections between communication devices based at least in part on a Voice over Internet Protocol connection; and The plurality of advertisements corresponds to a plurality of advertisers;

tracking, by the server system, advertisement performance of the plurality of advertisements based at least in part on the respective references and compiling advertisement performance data corresponding to the plurality of advertisements and the plurality of advertisers;

generating and transmitting, by the server system, a file to an end-user device to facilitate displaying a user interface, via an application of the end-user device, to allow display of i) the advertisement performance data and ii) competitor advertisement attributes and iii) to allow selection of user-selectable options corresponding to advertisement attributes for editing of the plurality of advertisements, where:

the advertisement performance data comprises statistics indicating advertisement performance of the plurality of advertisements for a first time period and a comparison of the advertisement performance of the plurality of advertisements for the first time period to previous advertisement performance of the plurality of advertisements for a previous time period;

the competitor advertisement attributes comprise different respective attributes of competitors correlated to each advertisement of the plurality of advertisements; and the generating and transmitting of the file is responsive to receiving, by the server system, a signal from the end-user device indicating activation of a link displayed via the application of the end-user device;

receiving, by the server system, a first transmission indicating user input selecting a user-selectable option corresponding to the advertisement attributes;

consequent to processing the first transmission, causing, by the server system, the user interface to present a representation of the plurality of advertisements simultaneously via the application of the end-user device to allow editing of more than one advertisement of the advertisements of the plurality of advertisements, wherein the user interface comprises editable fields for the advertisement attributes selected according to the user input; and processing, by the server system, a second transmission indicating changes to the more than one advertisement of the plurality of advertisements and updating the advertisement database, in response to a user indication to the user interface.

2. The method of claim 1, wherein the user interface comprises a hypertext markup language document.

3. The method of claim 2, wherein the hypertext markup language document comprises a spreadsheet showing a plurality of attributes of the plurality of advertisements.

4. The method of claim 1, further comprising:

receiving user input selecting the plurality of advertisements of more than one user, prior to the causing of the user interface to present the plurality of advertisements.

5. The method of claim 1, further comprising:

providing a feedback indicating whether there is an error in updating an advertisement in response to input received in the user interface.

6. The method of claim 1, wherein the user interface comprises a field to indicate a status of a previous update to a first advertisement and a field to allow further editing of attributes of the first advertisement.

7. The method of claim 1, wherein the user interface allows selection of more than one user.

8. The method of claim 7, further comprising:

displaying statistics of advertisements of the more than one user in the user interface to allow selection of a subset of the advertisements of the more than one user for editing.

9. The method of claim 7, wherein the user interface further allows selection of user attributes for editing of the more than one user.

10. The method of claim 7, wherein the advertisement attributes include at least one of bid price, advertisement category, description, service area, status, phone number, or business name.

11. The method of claim 1, wherein the user interface includes a plurality of fields for associating image files with the plurality of advertisements, each of the plurality of fields providing a set of selection options to select one image file from a set of image files in a server.

12. The method of claim 11, further comprising:

updating the set of selection options in the user interface for a first field of the plurality of fields after receiving an uploaded image file at the server.

13. The method of claim 1, further comprising:

causing the user interface to show a plurality of users simultaneously and allow editing of an attribute of any of the plurality of users.

14. The method of claim 13, wherein the attribute is one of a user name, password, street address, name, phone number, company name, email address, or payment information.

15. A non-transitory machine readable medium containing instructions which when executed on a server system cause the server system to:

generate advertising content for a plurality of advertisements and store the plurality of advertisements stored in an advertisement database of the server system, where:

a respective reference is assigned to each advertisement of the plurality of advertisements, the respective reference facilitating real time communication connections between communication devices based at least in part on a Voice over Internet Protocol connection; and the plurality of advertisements corresponds to a plurality of advertisers;

track advertisement performance of the plurality of advertisements based at least in part on the respective references and compile advertisement performance data corresponding to the plurality of advertisements and the plurality of advertisers;

generate and transmit a file to an end-user device to facilitate displaying a user interface, via an application of the end-user device, to allow display of i) the advertisement performance data and ii) competitor advertisement attributes and iii) to allow selection of user-selectable options corresponding to advertisement attributes for editing of the plurality of advertisements, where:

the advertisement performance data comprises statistics indicating advertisement performance of the plurality of advertisements for a first time period and a comparison of the advertisement performance of the plurality of advertisements for the first time period to previous advertisement performance of the plurality of advertisements for a previous time period;

the competitor advertisement attributes comprise different respective attributes of competitors correlated to each advertisement of the plurality of advertisements; and the generating and transmitting of the file is responsive to receiving, by the server system, a signal from the end-user device indicating activation of a link displayed via the application of the end-user device;

receive a first transmission indicating user input selecting a user-selectable option corresponding to the advertisement attributes for editing of more than one advertisement of the plurality of advertisements;

consequent to processing the first transmission, causing the user interface to present a representation of the plurality of advertisements simultaneously via the application of the end-user device to allow editing of the more than one advertisement of the plurality of advertisements, wherein the user interface includes editable fields for the advertisement attributes selected according to the user input; and process a second transmission indicating changes to the more than one advertisement of the plurality of advertisements and updating the advertisement database, in response to a user indication to the user interface.

16. A system, comprising:

a server system coupled to one or more network interfaces to facilitate access to a communication network, and memory coupled to one or more servers of the server system and storing instructions that, when executed by the one or more servers, cause the server system to:

generate advertising content for a plurality of advertisements and store the plurality of advertisements stored in an advertisement database of the server system, where:

a respective reference is assigned to each advertisement of the plurality of advertisements, the respective reference facilitating real time communication connections between communication devices based at least in part on a Voice over Internet Protocol connection; and the plurality of advertisements corresponds to a plurality of advertisers;

track advertisement performance of the plurality of advertisements based at least in part on the respective references and compile advertisement performance data corresponding to the plurality of advertisements and the plurality of advertisers;

generate and transmit a file to an end-user device to facilitate displaying a user interface, via an application of the end-user device, to allow display of i) the advertisement performance data and ii) competitor advertisement attributes and iii) to allow selection of user-selectable options corresponding to advertisement attributes for editing of the plurality of advertisements, where:

the advertisement performance data comprises statistics indicating advertisement performance of the plurality of advertisements for a first time period and a comparison of the advertisement performance of the plurality of advertisements for the first time period to previous advertisement performance of the plurality of advertisements for a previous time period;

the competitor advertisement attributes comprise different respective attributes of competitors correlated to each advertisement of the plurality of advertisements; and the generating and transmitting of the file is responsive to receiving, by the server system, a signal from the end-user device indicating activation of a link displayed via the application of the end-user device;

receive a first transmission indicating user input selecting a user-selectable option corresponding to the advertisement attributes for editing of more than one advertisement of the plurality of advertisements;

consequent to processing the first transmission, causing the a user interface to present a representation of the plurality of advertisements simultaneously via the application of the end-user device to allow editing of the more than one advertisement of the plurality of advertisements, wherein the user interface includes editable fields for the advertisement attributes selected according to the user input; and process a second transmission indicating changes to the more than one advertisement of the plurality of advertisements and updating the advertisement database, in response to a user indication to the user interface.

\* \* \* \* \*